US010311446B2

(12) United States Patent
Prehofer et al.

(10) Patent No.: US 10,311,446 B2
(45) Date of Patent: Jun. 4, 2019

(54) METHOD AND APPARATUS FOR OBFUSCATING CONTEXT INFORMATION

(75) Inventors: Christian Prehofer, Espoo (FI); Sasu Tarkoma, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 685 days.

(21) Appl. No.: 12/329,499

(22) Filed: Dec. 5, 2008

(65) Prior Publication Data

US 2010/0146583 A1 Jun. 10, 2010

(51) Int. Cl.
G06Q 30/00 (2012.01)
G06Q 30/02 (2012.01)
G06Q 10/10 (2012.01)

(52) U.S. Cl.
CPC ............. G06Q 30/02 (2013.01); G06Q 10/10 (2013.01)

(58) Field of Classification Search
USPC ...................................... 705/50–79
See application file for complete search history.

(56) References Cited

U.S. PATENT DOCUMENTS

| 6,750,883 | B1 | 6/2004 | Parupudi et al. |
| 7,694,328 | B2* | 4/2010 | Joshi ........................ G06F 21/51 726/2 |
| 2002/0119788 | A1 | 8/2002 | Parupudi et al. |
| 2003/0135582 | A1 | 7/2003 | Allen et al. |
| 2003/0182394 | A1 | 9/2003 | Ryngler et al. |
| 2008/0248815 | A1* | 10/2008 | Busch ................... H04W 4/029 455/456.5 |
| 2008/0287112 | A1* | 11/2008 | Mullen ................... H04W 8/14 455/414.3 |
| 2010/0146583 | A1* | 6/2010 | Prehofer ................ G06Q 10/10 726/1 |
| 2010/0192212 | A1* | 7/2010 | Raleigh ............ G06Q 10/06375 726/7 |

FOREIGN PATENT DOCUMENTS

| JP | 2005099944 A | * | 4/2005 | ............ G06Q 30/00 |
| JP | 2008234041 A | | 10/2008 | |

OTHER PUBLICATIONS

White, Ron, How Computers Work, 9th Ed., Que Corporation, Nov. 14, 2007.*
Parameswaran, Rupa. A Robust Data Obfuscation Approach for Privacy Preserving Collaborative Filtering. (Aug. 2006). Retrieved online Jan. 9, 2019. https://pdfs.semanticscholar.org/146a/4009e6415d300be846914b4850cbc068cc1c.pdf (Year: 2006).*

(Continued)

*Primary Examiner* — James A Reagan
(74) *Attorney, Agent, or Firm* — Ditthavong & Steiner, P.C.

(57) ABSTRACT

In some examples, context information is determined. The context information is associated with a user and based on information of a communication device associated with the user. The context information is obfuscated based on a user information, such privacy policy, user profile, user preferences, user activity, and/or any combination of the aforementioned, associated with the user. In other examples, the context information is determined based on a user location and/or user information.

20 Claims, 14 Drawing Sheets

(56) References Cited

OTHER PUBLICATIONS

International Search Report and Written Opinion of corresponding International Application No. PCT/FI2009/050930 dated Mar. 11, 2010, pp. 1-15.
Notification of the First Office Action for Chinese Application No. 200980148871.5, dated Jan. 18, 2013, 11 pages.
Chinese Office Action with English Translation for corresponding Patent Application No. 200980148871.5 dated Sep. 26, 2013, 10 pages.
Office Action for corresponding European Patent Application No. 09 830 054.4-1958, dated Sep. 29, 2016, 6 pages.
Office Action for corresponding Indian Patent Application No. 4724/CHENP/2011, dated Mar. 27, 2018, 6 pages.

\* cited by examiner

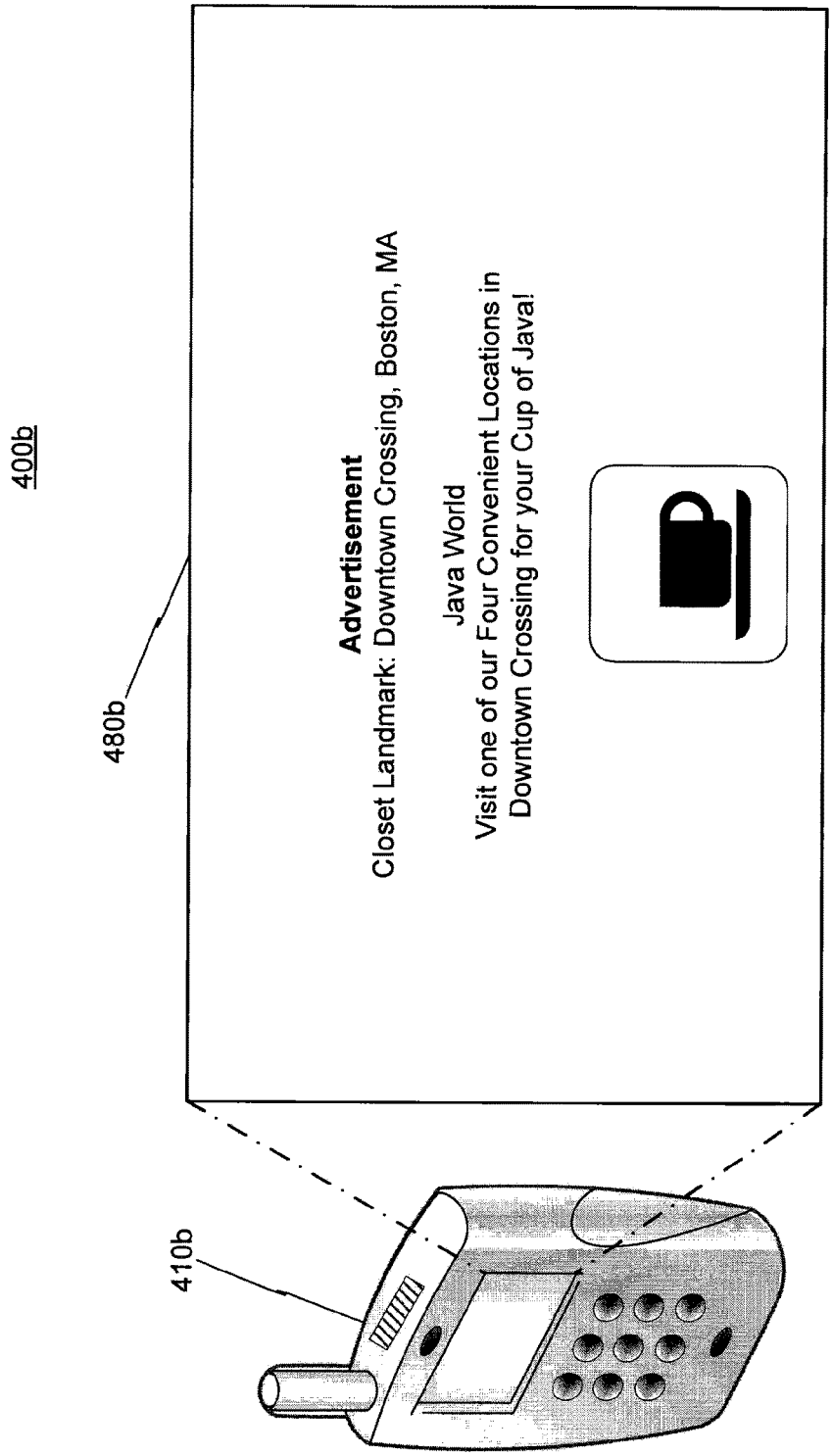

METHOD AND APPARATUS FOR OBFUSCATING CONTEXT INFORMATION

FIELD

The present application relates generally to obfuscating context information associated with a user. In particular, the present application relates to the obfuscating the context information based on user information.

BACKGROUND

This section is intended to provide a background or context to the technology that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Targeted value added service delivery is a key system component of current Internet service companies.

Mobile and wireless value added services are becoming more commonplace as the number of smart phones and smart places grows. Since smart phones typically feature rich Web browsers, these devices are taking part in the Web ecosystem and consuming the Web value added services. The Web advertisement model, however, does not take into account the unique features of the mobile and wireless environment and the different contextual parameters that change over time.

SUMMARY

In some aspects, the obfuscating context information includes a method. The method includes determining context information associated with a user based on information of a communication device associated with the user and obfuscating the context information based on a privacy policy associated with the user.

In other aspects, the obfuscating context information includes an apparatus. The apparatus includes a processor. The processor is configured to determine context information associated with a user based on information of a communication device associated with the user and obfuscate the context information based on a privacy policy associated with the user.

In other aspects, the obfuscating context information includes a computer-readable storage medium encoded with instructions that, when executed by a computer, perform determine context information associated with a user based on information of a communication device associated with the user and obfuscate the context information based on a privacy policy associated with the user.

In other aspects, the obfuscating context information includes an apparatus. The apparatus includes a means for determining context information associated with a user based on information of a communication device associated with the user and a means for obfuscating the context information based on a privacy policy associated with the user.

Any of the aspects described above may include one or more of the following embodiments.

In some embodiments, the method further includes determining the context information based on a user location associated with a location of the communication device associated with the user.

In some embodiments, the method further includes communicating the obfuscated context information to a third-party server for a value added service.

In some embodiments, the method further includes receiving an update request from the third-party server; obfuscating the context information based on the privacy policy and the update request to form a second obfuscated context information; and communicating the second obfuscated context information to the third-party server for the value added service.

In some embodiments, the method further includes modifying the privacy policy based on a privacy update request from the user.

In some embodiments, wherein the obfuscating the context information based on the privacy policy further including obfuscating the context information based on the privacy policy and a third-party server preference.

In some embodiments, wherein the obfuscating the context information based on the privacy policy further including enlarging a user location and/or a user group based on the privacy policy.

In some embodiments, wherein the obfuscating the context information based on the privacy policy further including determining a generic user preference and/or a user category based on the privacy policy.

In some embodiments, wherein the obfuscating the context information based on the privacy policy further including selecting a landmark associated with a user location and/or the context information based on the privacy policy.

In some embodiments, the method further includes communicating part or all of the privacy policy to a plurality of communication devices; and receiving privacy policy information from the plurality of communication devices; wherein the obfuscating the context information based on the privacy policy further including obfuscating the context information based on the privacy policy and/or the privacy policy information.

In some embodiments, the method further includes receiving one or more media objects for obfuscation, the context information including metadata of the one or more media objects; and obfuscating the metadata based on the privacy policy.

In some embodiments, the method further includes receiving a level identification of one or more object categories for obfuscation, and determining the privacy policy associated with the user based on the level identification.

In some embodiments, wherein the processor further configured to determine the context information based on a user location associated with a location of the communication device associated with the user.

In some embodiments, wherein the processor further configured to determine the context information based on user information associated with the user.

In some embodiments, the apparatus further includes a transceiver configured to communicate the obfuscated context information to a third-party server.

In some embodiments, the apparatus further includes a second transceiver configured to receive a value added service from the third-party server and a display device configured to play the value added service, the display device in proximity to the user location.

In some embodiments, the apparatus further includes the transceiver further configured to receive a value added service from the third-party server; and a display configured to play the value added service, the display associated with a communication device associated with the user.

In other embodiments, the method further including determining the context information based on user information associated with the user.

In some embodiments, the user information includes a user presence, a user activity, a user profile, a user preference, and/or any combination thereof.

In other embodiments, the method further including receiving a value added service from the third-party server and playing the value added service on a display device in proximity to the user location.

In some embodiments, the method further including receiving a value added service from the third-party server and playing the value added service on the communication device associated with the user.

In other embodiments, the value added service includes an advertisement.

In some embodiments, the update request includes target usage information for an intended value added service.

In other embodiments, the update request includes minimum context information for the value added service, preferred information for the value added service, value added service options associated with the obfuscated context information, value added service type information, a value added service field, or any combination thereof.

In some embodiments, the method further including determining the third-party server from a plurality of third-party servers based on the obfuscated context information, a third-party server preference, or any combination thereof.

In other embodiments, the privacy policy is a group privacy policy and the method further including modifying the group privacy policy based on a privacy update request.

In some embodiments, the obfuscating the context information based on the privacy policy further including modifying the context information on a context hierarchy based on the privacy policy.

In other embodiments, the privacy policy includes an allowed location level, an allowed presence level, an allowed activity level, an allowed user profile detail, an allowed user preference, an allowed user device detail, and/or any combination thereof In some embodiments, the method further including modifying the privacy policy based on the metadata.

In other embodiments, the method further including modifying the metadata information based on the privacy policy.

In some embodiments, the level identification of the one or more object categories identifies a pre-determined privacy level in a plurality of pre-determined privacy levels.

In other embodiments, the apparatus further including a privacy policy processor further configured to modify the privacy policy based on a privacy update request from the user.

In some embodiments, the obfuscating the context information based on the privacy policy further including obfuscating the context information based on the privacy policy and at least one part of the context information.

These and other advantages and features of various embodiments, together with the organization and manner of operation thereof, will become apparent from the following detailed description when taken in conjunction with the accompanying drawings.

BRIEF DESCRIPTION OF THE DRAWINGS

Embodiments are described by referring to the attached drawings, in which:

FIGS. 4A-4C illustrate example embodiment of a communication devices;

DETAILED DESCRIPTION

In the following description, for purposes of explanation and not limitation, details and descriptions are set forth in order to provide a thorough understanding of the embodiments. However, it will be apparent to those skilled in the art that the embodiments may be practiced in other embodiments that depart from these details and descriptions.

Figure 1:
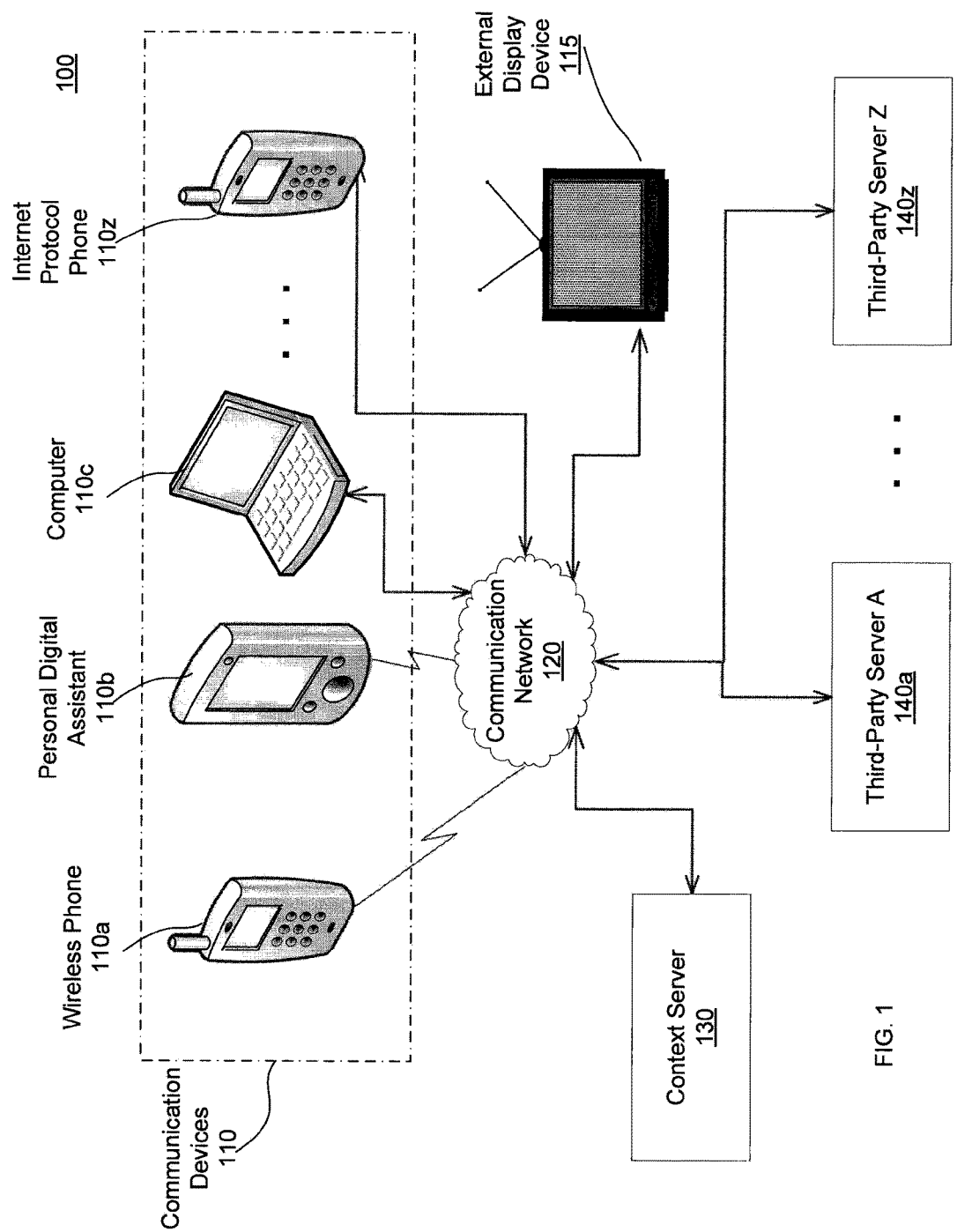
FIG. 1 illustrates an example embodiment of a block diagram of a communication system.

FIG. 1, an example embodiment of the invention, illustrates an example block diagram of a communication system 100. The communication system 100 includes communications devices 110, an external display device 115, a communication network 120, a context server 130, and a plurality of third-party servers A 140A through Z 140Z (generally referred to as third-party server 140). The communication system 100 is utilized to obfuscate context information associated with a user and/or user device, such as the communication device 110, based on user information, such as a privacy policy associated with the user, user profile, user preferences and/or user activity, and/or communicate the obfuscated context information to at least one of the third-party servers 140.

The communication devices 110 include, but are not limited to, a wireless phone 110A, a personal digital assistant 110B, a computer 110C through an internet protocol phone 110D (generally referred to as communication device 110). The communication device 110 communicates with the context server 130 and/or the third-party server 140 via the communication network 120. The external display device 115 communicates with the context server 130 and/or the third-party server 140 via the communication network 120.

Figure 2A:
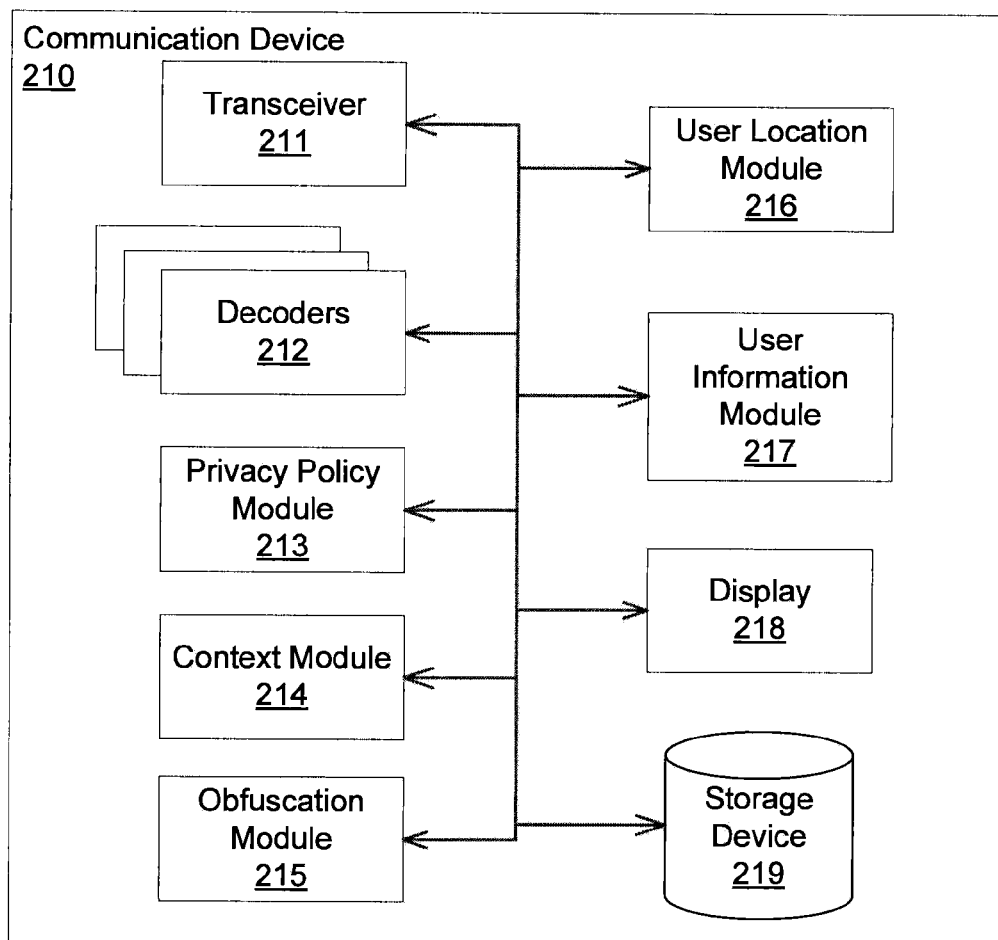
FIG. 2A illustrates an example embodiment of a communication device.

FIG. 2A, an example embodiment of the invention, illustrates an example system 200a that includes a communication device 210, such as the communication device 110. The communication device 210 includes a transceiver 211, decoders 212, a privacy policy module 213, a context module 214, an obfuscation module 215, a user location module 216, a user information module 217, a display 218, and a storage device 219. The transceiver 211 communicates with other communication devices, context servers, and/or third-party servers via a communication network. The decoders 212 decode data received from the transceiver 211.

The privacy policy module 213 processes and/or updates the user privacy policy based on privacy update requests.

The context module 214 determines the context information based, for example, on information associated with the communication device 210, the user information, and/or the user location. The obfuscation module 215 obfuscates the context information based on the user information, such as the user privacy policy, user profile, user preferences and/or user activity. The user location module 216 determines the user location based on a location mechanism, e.g., Global Positioning System (GPS), etc. The user information module 217 determines the user information based on user preferences and/or other user information associated with the communication device 210. The display 218 plays multimedia and/or value added services. The storage device 219 stores the context information, the obfuscated context information, and/or the value added service. The storage device 219 may be, for example, any type of storage medium including a hard drive, a floppy disk, a storage area network (SAN), etc., any type of processing device including a central processor unit (CPU), a processor core, a field programmable gate array (FPGA), etc., and/or any type of computer-readable instructions including program code, program instructions, etc.

Figure 2B:
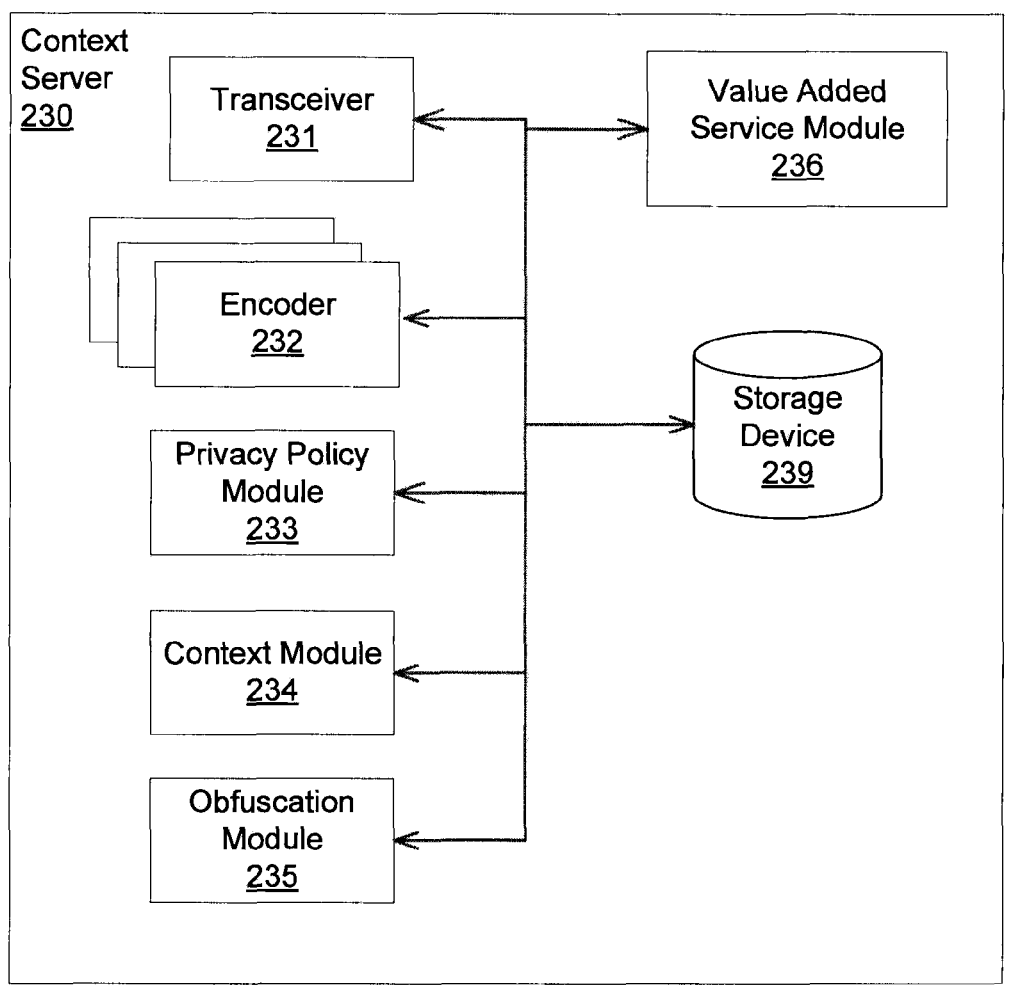
FIG. 2B illustrates an example embodiment of a context server.

FIG. 2B, an example embodiment of the invention, illustrates a system 200b with a context server 230. The context server 230 includes a transceiver 231, encoders 232, a privacy policy module 233, a context module 234, an obfuscation module 235, a value added service module 236 and a storage device 237. The transceiver 231 communicates with the communication devices, other context servers, and/or third-party servers via a communication network. The encoders 232 encode data for transmission based on encoder parameters associated with the communication network and/or the receiving party. The privacy policy module 233 processes and/or updates the user privacy policy based on privacy update requests.

The context module 234 determines the context information based, for example, on information associated with the communicate device associated with the user, the user information, and/or the user location. The obfuscation module 235 obfuscates the context information based on the user information, for example, on the user privacy policy. The value added service module 236 determines a third-party server from a plurality of third-party servers based on third-party server preferences and/or processes the value added service to facilitate communication to the communication device. The storage device 239 stores the context information, the obfuscated context information, and/or the value added service. The storage device 239 may be, for example, any type of storage medium including a hard drive, a floppy disk, a storage area network (SAN), etc., any type of processing device including a central processor unit (CPU), a processor core, a field programmable gate array (FPGA), etc., and/or any type of computer-readable instructions including program code, program instructions, etc.

Figure 2C:
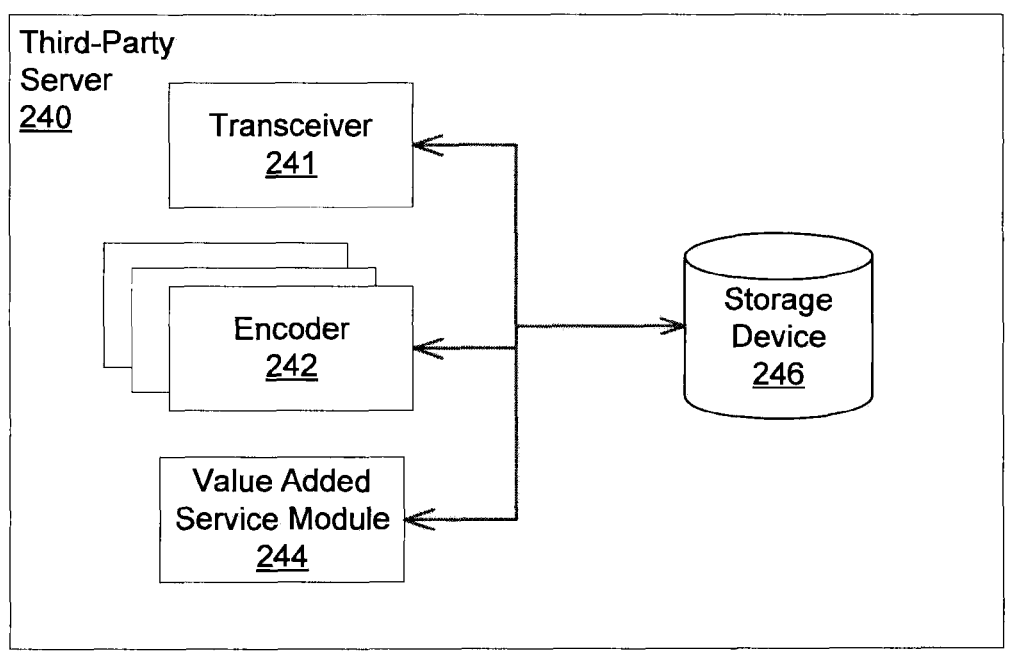
FIG. 2C illustrates an example embodiment of a third-party server.

FIG. 2C, an example embodiment of the invention, illustrates an example system 200c that includes a third party server 240. The third party server 240 includes a transceiver 241, encoders 242, a value added service module 244, and a storage device 246. The transceiver 241 communicates with the communication devices, the context servers, and/or other third-party servers via a communication network. The encoders 242 encode data for transmission based on the communication network and/or the receiving party. The value added service module 244 determines value added services based on the obfuscated context information and/or requests updates to the obfuscated context information based on the value added service requirements/needs. The storage device 246 stores the obfuscated context information and/or the value added services. The storage device 246 may be, for example, any type of storage medium including a hard drive, a floppy disk, a storage area network (SAN), etc., any type of processing device including a central processor unit (CPU), a processor core, a field programmable gate array (FPGA), etc., and/or any type of computer-readable instructions including program code, program instructions, etc.

Figure 3A:
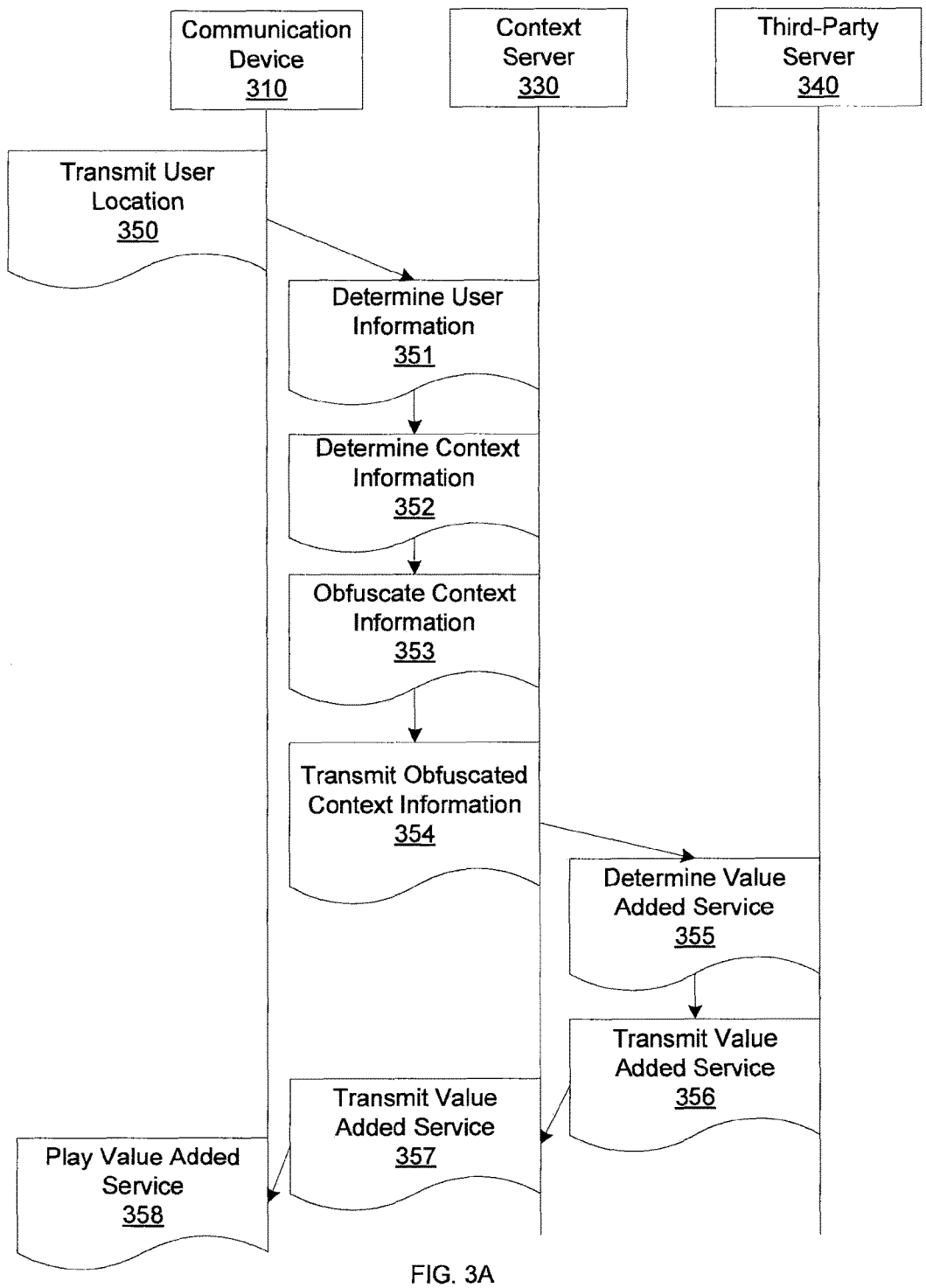
FIGS. 3A-3B illustrate example embodiment of a block diagrams of the flow of data.

FIG. 3A, an example embodiment of the invention, illustrates an example system 300a of the flow of context information and value added services. The system 300a includes a communication device 310, a context server 330, and a third-party server 340. The communication device 310 transmits, in 350, a user location through the context server 330. The context server 300 determines in 351 user information. The context server 330 determines in 362 context information based on the user location and/or the user information. The context server 330 obfuscates in 353 the context information based on user information, such as a user privacy policy, user profile, user preferences and/or user activity. The context server 330 transmits in 354 the obfuscated context information to a third-party server 340. The third-party server 340 determines in 355 a value added service based on the obfuscated context information. The third party server 340 transmits in 356 the value added service to the context server 330 The context server 330 transmits in 357 the value added service to the communication device 310. The communication device 310 plays in 358 the value added service. Alternatively, the value added service may be transmitted directly from the third party server 340 to the communication device 310.

Figure 3B:
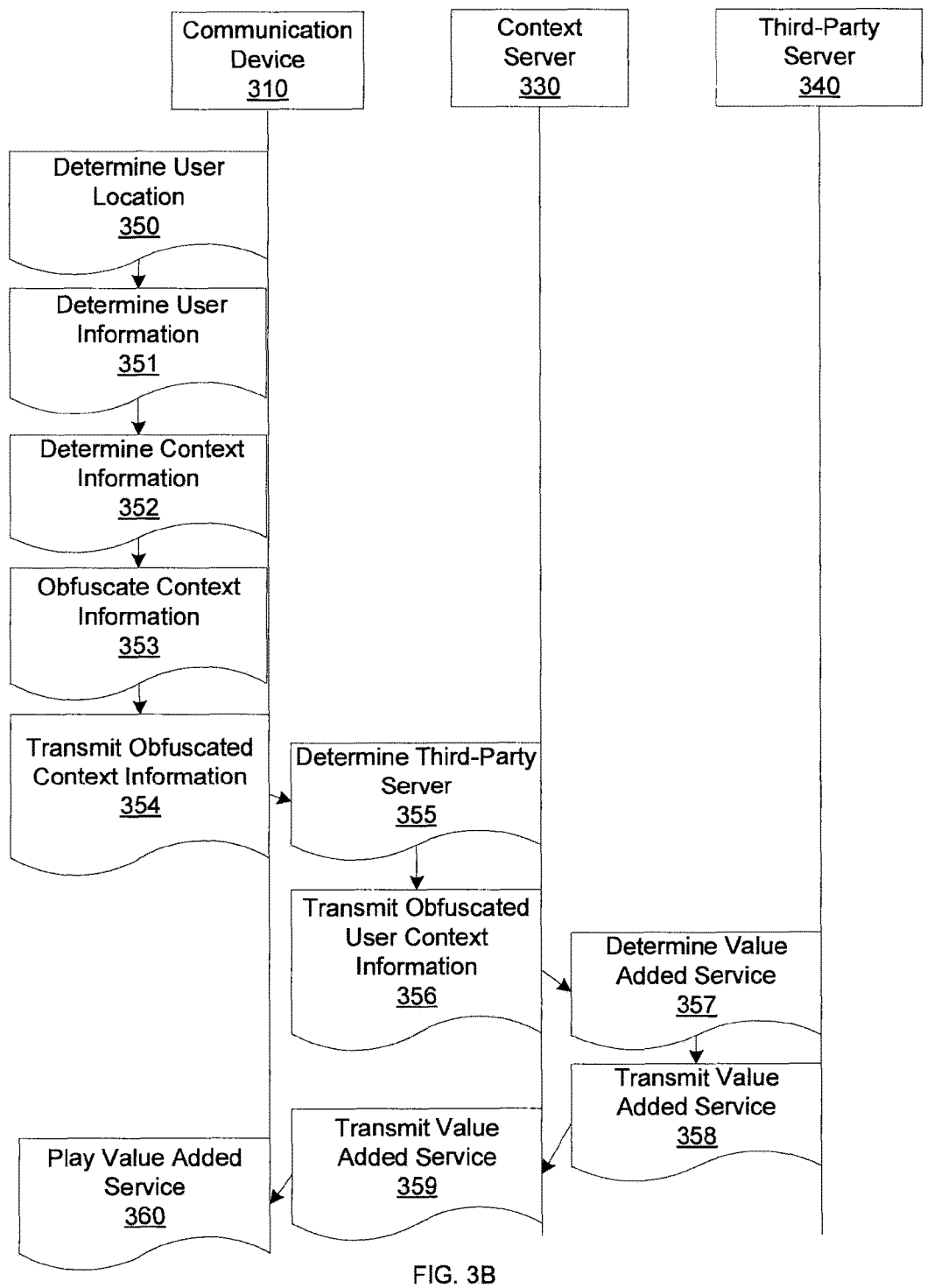

FIG. 3B, an example embodiment of the invention, illustrates an example system 300b for playing a value added service. The system 300B includes a communication device 310, a context server 330, and a third-party server 340. The communication device 310 determines in 350 a user location, e.g., GPS, cell phone tower triangulation, cell identification, etc. The communication device 310 determines in 351 user information, e.g., user preference, user activity, etc. The communication device 310 determines in 352 context information based on the user location and/or the user information. The communication device 310 obfuscates in 353 the context information based on the user information, for example, on a user privacy policy. The communication device 310 transmits in 354 the obfuscated context information to the context server 330. The context server 330 determines in 355 a third-party server 340 from a plurality of third-party servers based on the obfuscated context information. The context server 330 transmits in 356 the obfuscated user context information to the third-party server 340. The third-party server 340 determines in 357 a value added service based upon the obfuscated context information. The third-party server 340 transmits in 358 the value added service to the context server 330. The context server 330 transmits in 359 the value added service to the communication device 310. The communication device 310 plays in 360 the value added service (e.g., advertisement, movie, commercial, etc.). Alternatively, the value added service may be transmitted directly from the third party server 340 to the communication device 310.

Figure 4A:
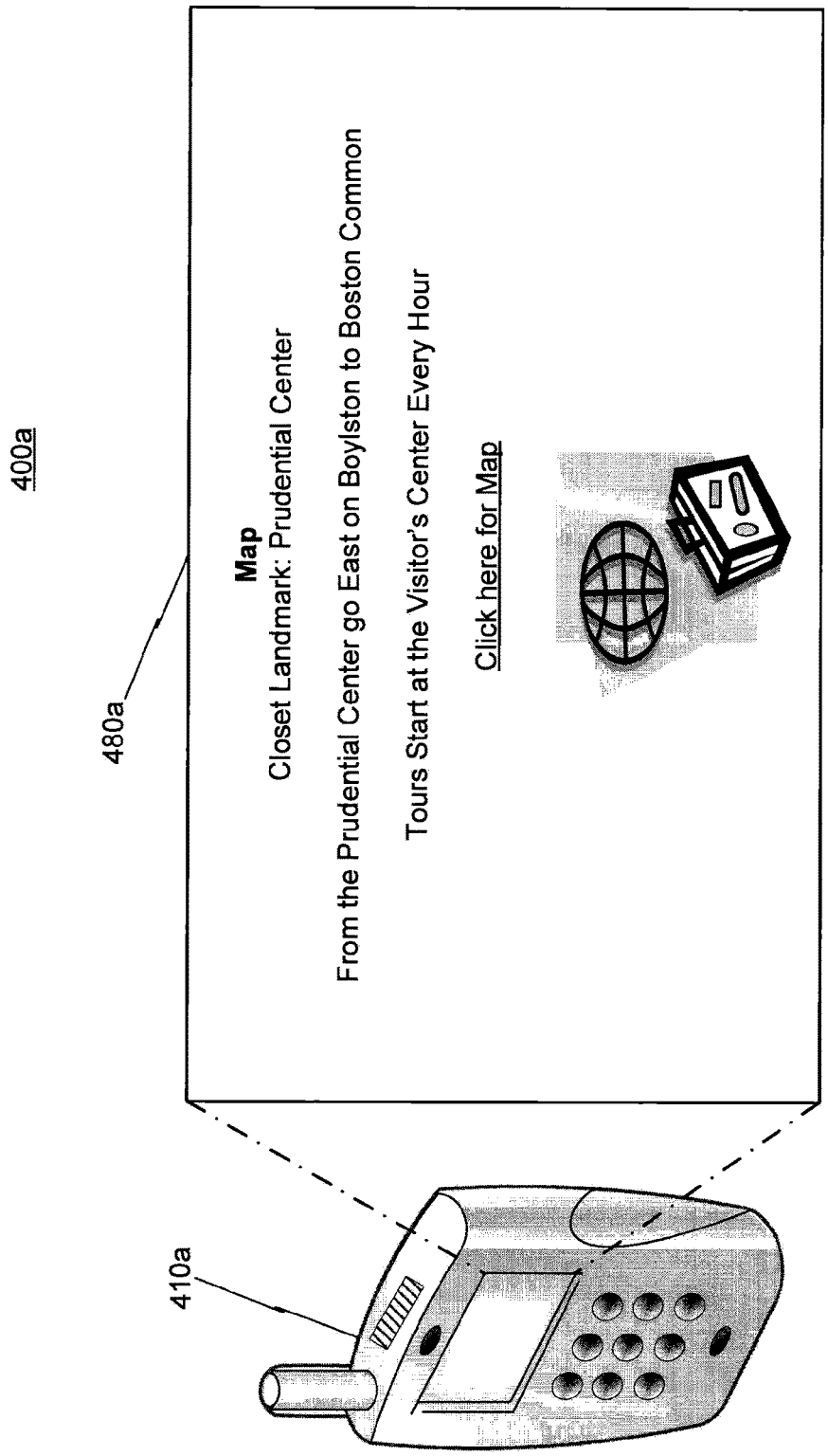

FIG. 4A, an example embodiment of the invention, illustrates an example system 400a that includes a display 480a of a communication device 410a. The display 480a illustrates the utilization of the system 400a for the determination of a closest landmark, the Prudential Center, directional information for the closed landmark, and a link to a map for the closed landmark. In this illustration, the communication device 410*a* obfuscates a specific user location, such as coordinates, to the closed landmark, i.e., the Prudential Center, and the user information, i.e., shopper, to receive the value added service, i.e., directions and a map.

In some examples, the display, e.g., 480*a*, and/or the external display device, e.g., 410*c* described herein may play any type of multimedia, e.g., sound, video, text, graphics, etc., and/or other stimuli. The display, e.g., 480*a*, and/or the external display device e.g., 410*c*, described herein may include, for example, any type of multimedia device. The multimedia devices may include, for example, a video display device e.g., liquid crystal display (LCD), a cathode ray tube (CRT), etc., an audio speaker, a tactile device, an olfaction device, and/or any other type of device. For example, the playing of a value added service may include, for example, the playing of a movie with video and audio components on the display 480*a*. In this example, the display 480*a* includes a video device and an audio device.

FIG. 4B, an example embodiment of the invention, illustrates an example system 400*b* that includes a display 480*b* of a communication device 410*b*. The display 480*b* illustrates the utilization of the system 400*b* for the playing of a value added service, i.e., an advertisement. In this illustration, the communication device 410*b* obfuscates the user location to the closed landmark, i.e., Downtown Crossing, and the user information, i.e., coffee drinker, to receive the value added service, i.e., an advertisement for Java World.

Figure 4C:
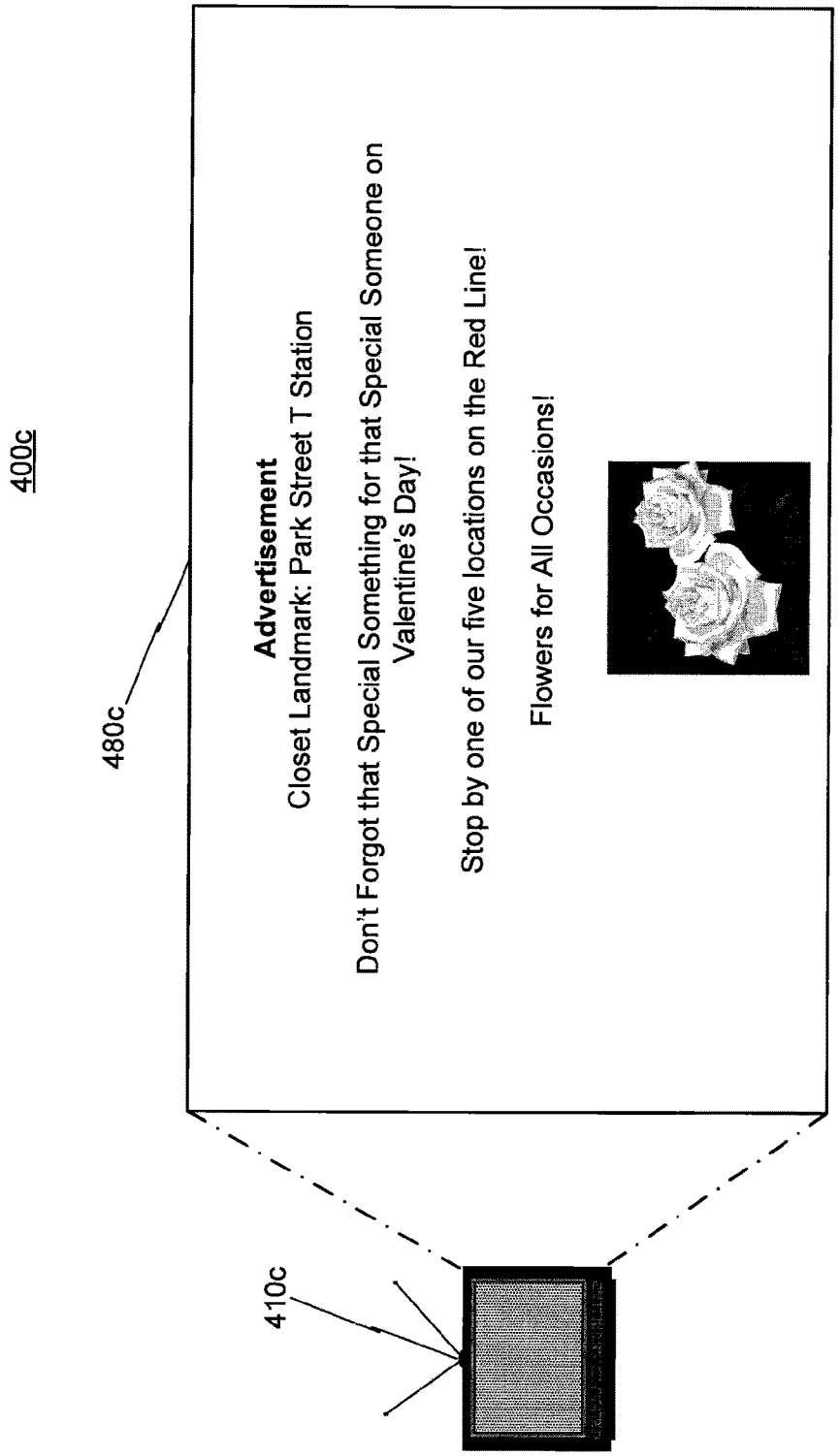

FIG. 4C, an example embodiment of the invention, illustrates an example system 400*c* that includes a display 480*c* of an external display device 410*c*. The display 480*c* illustrates the utilization of the system 400*c* for the playing of a value added service, i.e., an advertisement. In this illustration, the communication device (not shown) obfuscates the user location to the closed landmark, i.e., Park Street T Station, and the user information, i.e., married, to receive the value added service, i.e., an advertisement for Flowers for All Occasions, which is displayed on an external display device 410*c* in close proximity to the user.

In some example embodiments, the context server 130 and/or the communication device 110 determines user context information associated with a user based on information of the communication device 110 associated with the user. The context server 130 and/or the communication device 110 may obfuscate the user context information based on user information, such as a privacy policy associated with the user, user profile/preferences, user activity, and/or any combination thereof.

In one example, the user is close to Park Street Station in New York City. Further, the user has user profile that includes, for example he is a male, age 33, married, no children, and buys gifts frequently. Further, the communication device 110 has analyzed user's activity that the user is probably going home. Now the user's context information in this example is: Location—Park Street Station in New York City, Gender—male, Age—33, Status—married, Family—no children, Buying habits—gift category, Activity—going home.

In this example, first, the context server 130 and/or communication device 110 determines one or more landmarks around the user location. Those one or more landmarks may be such as a subway station, grocery store, shopping center, a flower shop, a jewelry store, a national monument, a government office, etc. Determination of the one or more landmarks may be done based on the user privacy policy that may describe for example min. or max. radius around the user location on which landmarks will be determined. Those landmarks may be selected from a general list of landmarks, or may be selected from user's own point-of-interest (POI) list, that may be stored in the communication device 110 and/or in the context server 130.

In this example, next, one or more suitable landmarks is determined based on the other user information, such as the Gender, Age, Status, Family, Buying habits, and/or Activity. Now the more suitable landmarks may be only the shopping center and the flower shop. Hence, the obfuscated user context information is: user is in New York City close to a shopping center and a flower shop.

In some further example embodiments, the obfuscated user context information is sent from the user communication device 310 to a third party server 340, that may be, for example, an advertisement server. Additionally, the obfuscated user context information may describe how many relevant advertisements, i.e. one or more, the user is willing to receive.

In some embodiments, the advertisement server stores advertisements with metadata that describes, for example, target audience and advertisement value for the advertiser. The advertisement server selects one or more suitable advertisements based on the obfuscated user context information and the advertisements' metadata information. As a further example, the advertisement server may have found one relevant flower shop advertisement and one relevant shopping mall advertisement. Additionally, the value of the flower shop advertisement is twenty cents and value of the shopping mall advertisement is ten cents. Based on this the flower shop advertisement is more valuable for the third-party server 340, so the server selects the flower shop advertisement and sends it to the user communication device 310. Alternatively, the third-party server 340 may send all the found relevant advertisements if this is allowed by the obfuscated user context information.

Figure 5:
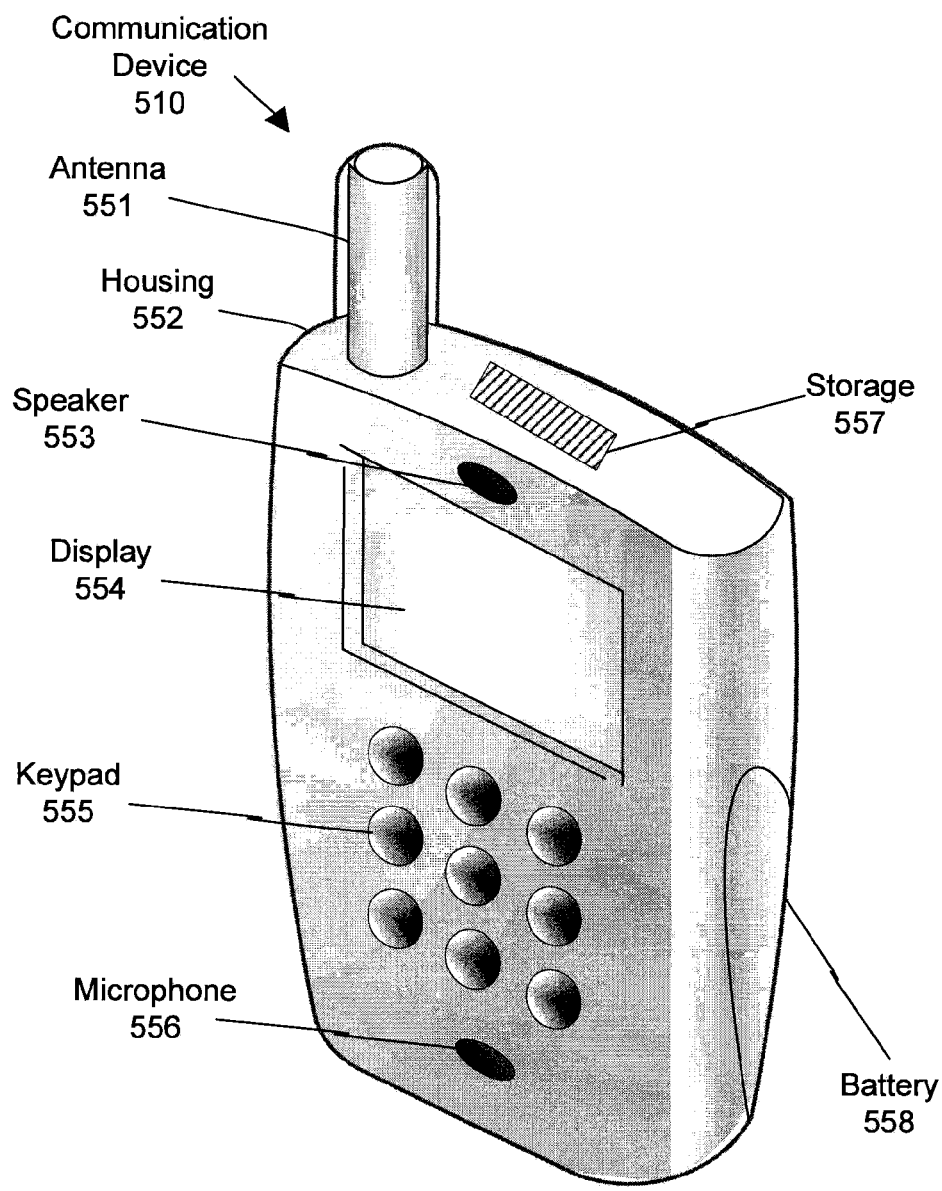
FIG. 5 illustrates another example embodiment of a communication device.

FIG. 5, an example embodiment of the invention, illustrates an example communication device 510 utilized in a communication system 500. The communication device 510 includes an antenna 551, a housing 552, a speaker 553, a display 554, a keypad 555, a microphone 556, storage 557, a battery 558, and a camera 559. The display 554 displays an interactive display 564 utilized for the call between communication devices. The communication device 510 may include, for example, any type of processing device including a central processor unit (CPU), a processor core, a field programmable gate array (FPGA), etc., and/or any type of computer-readable instructions including program code, program instructions, etc.

The antenna 551 is utilized to receive and/or transmit data signals and may be constructed from any known antenna materials. The housing 552 is a casing utilized to hold the components of the communication device 510, e.g., components illustrated in the communication device 210 of FIG. 2, components illustrated in the communication device 510, etc. The casing may be constructed from any known casing materials, e.g., plastic, metal, etc. The speaker 553 is utilized to reproduce data parts, e.g., audio data parts, etc., for the call. The communication device 510 may include, for example, a speaker output (not shown) that is utilized by an external speaker, e.g., head set, third-party speakers, wireless connected speakers, etc., to reproduce data parts.

The display 554 is utilized for the call to display details and/or other information associated with the call. The display 554 may display a video image, text, and/or any other type of multimedia information. The display 554 displays an interactive display 564 utilized for the call management. The user associated with the communication device 510 may setup and/or manage the call.

The keypad 555 is utilized for input of selections and/or other input information, e.g., name, phone number, etc. The microphone 556 is utilized for input of audio data, e.g., voice call, instructions, audio recording, etc. The communication device 510 may include, for example, a microphone output (not shown) that is utilized by an external microphone, e.g., head set, third-party microphone, wireless connected microphone, etc., to input audio. The storage 557 is utilized to store data, e.g., store multimedia data, retrieve multimedia data, store phone numbers, etc.) The storage 557 may be any type of memory storage comprising a removable memory storage and/or a permanent memory storage. The battery 558 is utilized for electrical power for the communication device 510. The battery 558 may be any type of power device, e.g., rechargeable battery, one-time use battery, etc. The camera 559 is utilized for input of video data, e.g., video call, movie, etc., and/or image data, e.g., picture, etc.

Figure 6:
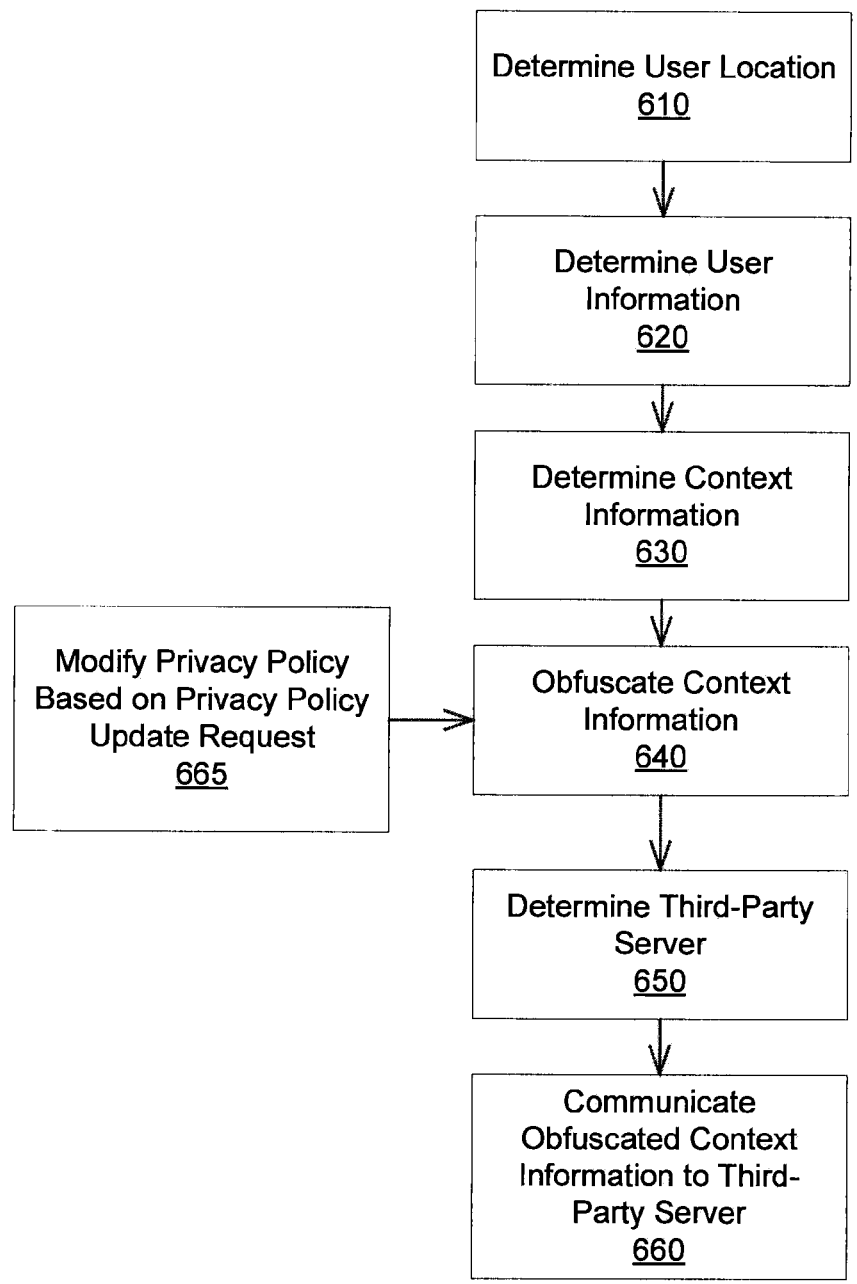
FIG. 6 is example embodiment of a flowchart illustrating obfuscation of context information.

FIG. 6, an example embodiment of the invention, is a flowchart 600 illustrating obfuscation of context information through the system 100 of FIG. 1. The communication device 110 determines in 610 a user location and determines in 620 user information. The communication device 110 determines in 630 context information based on information of the communication device 110 associated with the user, the user location, and/or the user information. The communication device 110 obfuscates in 640 the context information based on user information, such as a user privacy policy, user profile, user preferences and/or user activity, and communicates the obfuscated context information to the context server 130.

The context server 130 determines in 650 a third-party server from a plurality of third-party servers based on the obfuscated context information and/or a third-party server preference. The context server 130 communicates in 660 the obfuscated context information to the determined third-party server.

In other examples, the communication device 110 modifies in 665 the user privacy policy based on a privacy policy update request. The modification of the user privacy policy may occur before, during, and/or after the obfuscation of the context information. The user privacy policy update request may be received from the communication device 110, a different communication device Z 110z, the context server 130, and/or a third-party privacy policy server (not shown).

Figure 7:
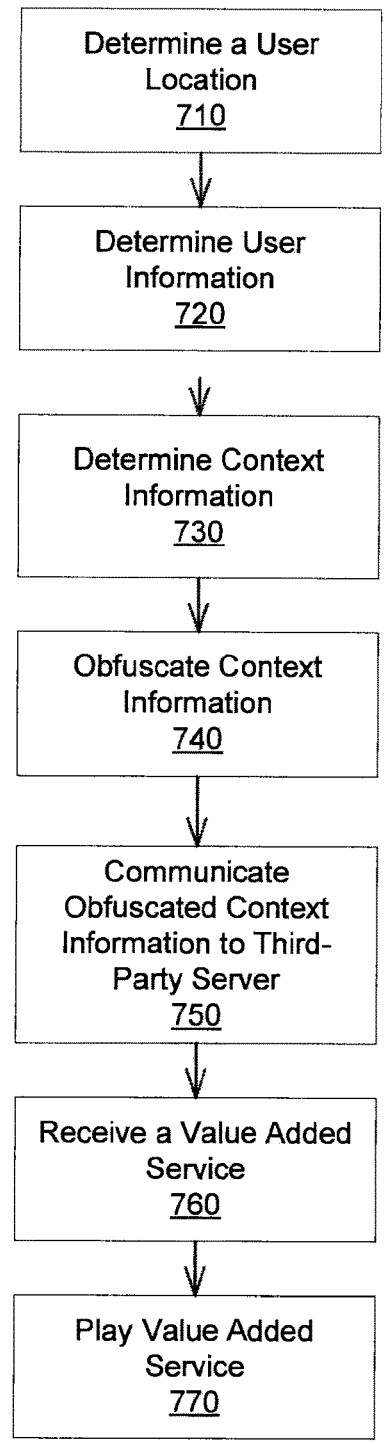
FIG. 7 is example embodiment of a flowchart illustrating playing of a value added service.

FIG. 7, an example embodiment of the invention, is a flowchart 700 illustrating playing of a value added service through the system 200 of FIG. 2. The user location module 216 determines in 710 a user location based on a location of the communication device 210 associated with the user. The user information module 217 determines in 720 user information associated with the user. The context module 214 determines in 730) the context information based on information of the communication device 210, the user location, and/or the user information. The obfuscation module 215 obfuscates in 740 the context information based on user information, such as a user privacy policy, user profile, user preferences and/or user activity.

The transceiver 211 communicates in 750 the obfuscated context information to a third-party server. The obfuscated context information may be communicated via a proxy to hide the identity of the communication device 210. The transceiver 211 receives in 760 a value added service from the third-party server. The display 218 plays in 770 the value added service, e.g., advertisement.

Figure 8:
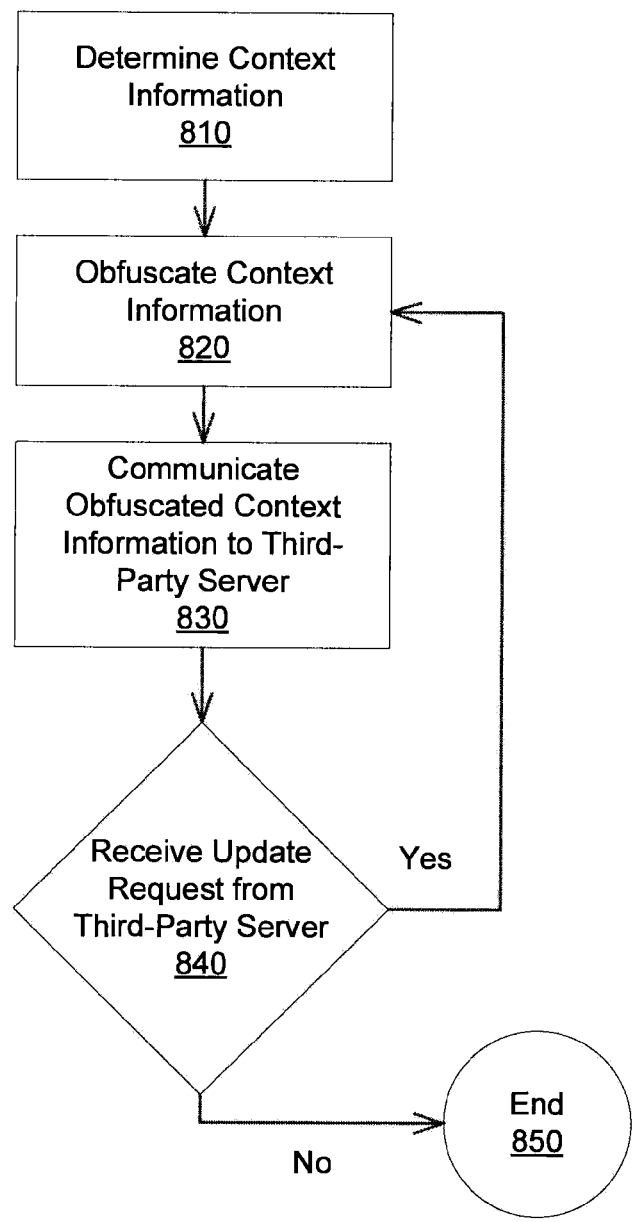
FIG. 8 is example embodiment of a flowchart illustrating an update request.

FIG. 8, an example embodiment of the invention, is a flowchart 800 illustrating an update request through the system 100 of FIG. 1. The context server 130 determines in 810 context information based on information of a communication device associated with a user. The context server 130 obfuscates in 820 the context information based on user information, such as a user privacy policy, user profile, user preferences and/or user activity associated with the user. The context server 130 communicates in 830 the obfuscated context information to the third-party server 140. If the context server 130 receives in 840 an update request from the third-party server 140, the context server obfuscates in 820 the context information again based on the user information, such as the user privacy policy, and the update request and communicates in 830 the revised obfuscated context information to the third-party server 140. If the context server 130 does not receive in 840 an update request from the third-party server 140, the processing of the context information ends in 850.

Figure 9:
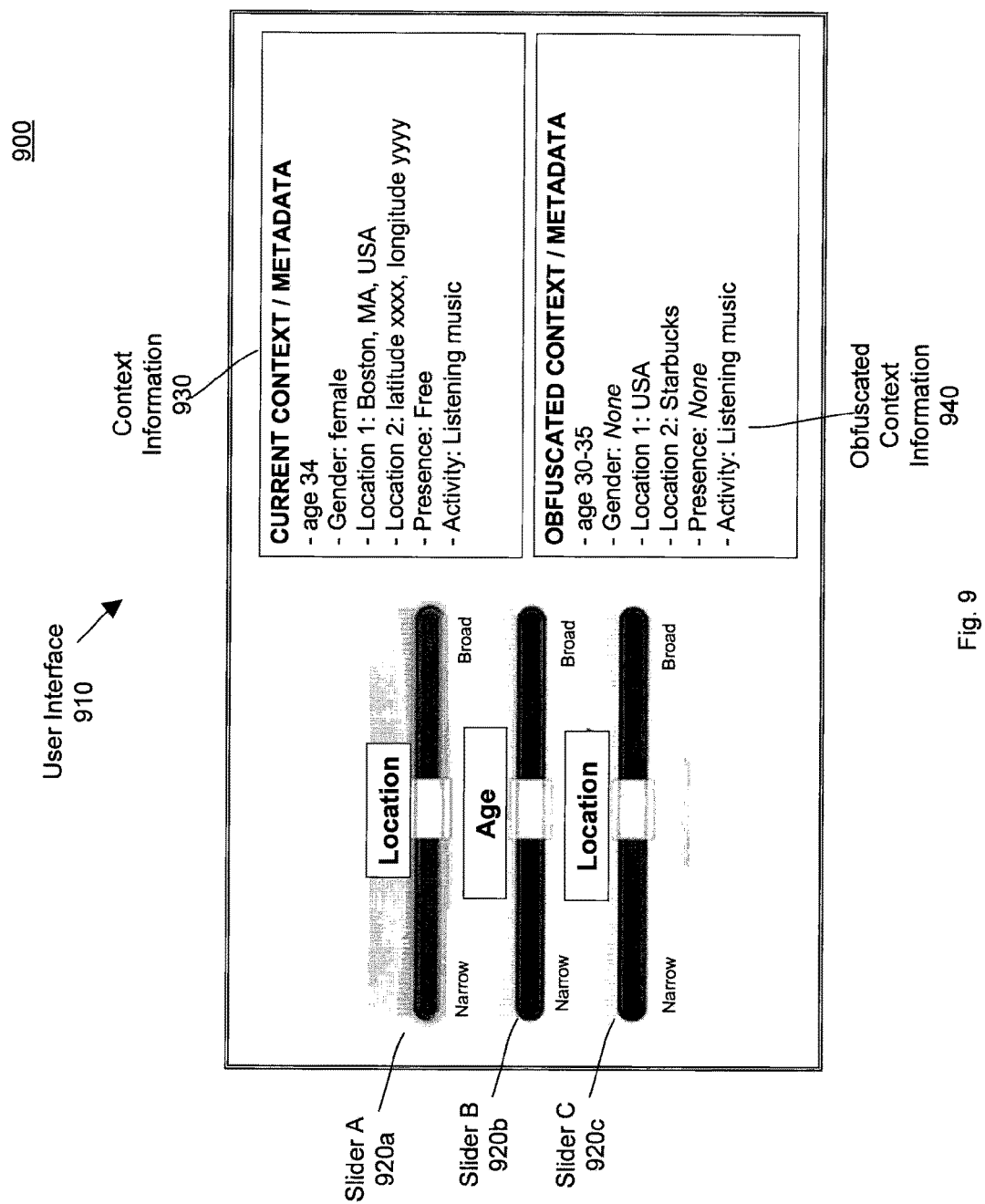
FIG. 9 is example embodiment of a user interface illustrating sliders.

FIG. 9 is example embodiment of a user interface 900 illustrating sliders A 920a, B 920b, and C 920c (generally referred to as slider 920). The user interface 900 further illustrates current context information/metadata 930 and obfuscated context information 940. The user utilizes the communication device 110 of FIG. 1 to interact the user interface 900 to adjust the one or more of the sliders 920. For example, the user adjusts the location slider, slider A 920a, to narrow or broaden the location 1 that may be communication to the third-party server 140. As illustrated in the user interface 900, the location 1 of Boston, Mass., USA is obfuscated to USA. As a further example, the user adjusts the age slider, slider B 920b, to narrow or broaden the age that may be communicated to the third-party server 140. As illustrated in the user interface 900, the age 34 is obfuscated to the age range 30-35. As another example, the user adjusts the location 2 slider, to narrow or broaden the location that may be communicated to the third-party server 140. As illustrated in the user interface 900, the location 2 with latitude and longitude is obfuscated to being near a Starbucks location.

Although FIG. 9 illustrates three sliders 920, the user interface 900 can utilize any number of sliders, e.g., one, ten, twenty, etc. Any context/metadata item, such as the location, age, gender, etc., may have its own slider 920. Alternatively, the user interface 900 may utilize a single slider that provides for a single and general privacy level, e.g., low, medium, high, etc., by adjusting one or more the context/metadata items at the same time.

In some example embodiments, the communication device 110 and/or the context server 130 receives a level identification of one or more object categories for obfuscation and determines the user privacy policy associated with the user based on the level identification. The level identification may be, for example, adjusted by a user via one or more slider objects 920 in a user interface 900. The slider object may enable the user to modify the user privacy policy based on the selected level identification. For example, the level identification includes multiple levels for different levels to obfuscate data for privacy. The multiple levels may include, for example, add randomness to tracks to hide details, take out details of a track, reduce resolution, obfuscate faces in an image, take out details in the timing of an event, aggregate phone call information, generalize artist, generalize media consumption, and/or any other type of action to increase a user's privacy.

In some example embodiments, the level identification of the one or more object categories identifies a pre-determined privacy level in a plurality of pre-determined privacy levels. For example, the user has the option to choose low, medium, or high for a privacy level, and each of the options has pre-set privacy levels.

In some example embodiments, the context server 130 and/or the communication device 110 determines context information associated with a user based on information of the communication device 110 associated with the user. The context server 130 and/or the communication device 110 may, for example, obfuscate the context information based on user information, such as a user privacy policy, user profile, user preferences and/or user activity, associated with the user. The obfuscation of the context information may include, for example, removing data, generalizing data, making data more un-precise, replacing data with random data, and/or any other mechanism to make the content information obscure or unclear. An advantage of the obfuscation of the context information is that the obfuscation of the context information enables the user to efficiently receive value added services while still retaining a level of privacy. In other words, the context information is obfuscated in several dimensions, e.g., location, user activity, etc., to meet privacy constraints while providing hints to value added service providers for targeted value added services.

For example, the context server 130 determines the context information, in this example, user age of twenty five and user location of gate five at the airport, associated with the user based on information of the communication device 110 associated with the user, in this example, user preference stored in the communication device 110 and the global positioning system (GPS) coordinates from a GPS receiver. The context server 130 obfuscates this context information based on the user information, such as the user privacy policy, associated with the user, in this example, only give age range and only give user location in at least one city block. As such, the obfuscated context information, in this example, includes user age range of twenty to thirty and user location of at the airport.

An advantage of the obfuscation of the context information is that user information may be shared with third-party servers and/or other communication devices, but the details that identify the user may be hidden thereby enabling broader access to user information while still protecting the identity of the user. In other words, the level of abstraction of the context information is balanced between the need for privacy and the needs of the value added service providers. Due to the privacy issues surrounding a user's communication device, e.g., exact location at any time, last purchase by the user, etc., the system 100 enables the obfuscation of the private information while still enabling the delivery of value added services.

In another example embodiment, the communication device 110 determines the context information, in this example, current activity is talking and user location of at a train station, associated with the user based on information of the communication device 110 associated with the user (in this example, activity of the communication device 110 and the triangulated coordinates based on the cell phone towers). The communication device 110 obfuscates this context information based on the user information, such as a user privacy policy, user profile, user preferences and/or user activity, associated with the user, in this example, current activity is ok and location within one hundred meters is ok. As such, the obfuscated context information, in this example, includes the current user activity of talking and user location of at the train station. Another advantage is that the privacy concerns are mitigated as long as at least k-other people, i.e., k number of other people, are in the same location/category and/or it is practically impossible to identify the user.

In other examples, the context server 130 and/or the communication device 110 determines the context information based on a user location associated with a location of the communication device 110 associated with the user. For example, the user location associated with the location of the communication device 110 associated with the user is determined utilizing GPS, triangulation of the communication device 110 using communication transceivers, e.g., cell phone towers, wireless network interface, etc., and/or any other type of location detection mechanism.

The user location may, for example, be restricted in the user privacy policy during the obfuscation of the context information based on an allowed location level including an allowed size/accuracy of a geographical area around the user location, an allowed landmark type, and/or any other type of location restriction. The allowed size/accuracy of the geographical area around the user location may, for example, include a radius, e.g., minimum radius, radius based on landmark density, etc., a part or all of a zip code, e.g., maximum number of digits in the zip code, number of digits based on landmark density, etc., a political delineation or part thereof, e.g., town, city, county, state, region, country, etc., and/or any other type of allowed size/accuracy of the geographical area. The allowed landmark type may, for example, include a general landmark, e.g., tourist attraction, train station, metro station, airport, music store, grocery store, pharmacy, etc., a particular store or chain of stores, e.g., global store, regional store, local store, etc., and/or any other type of delineation or type of landmark.

In some example embodiments, the context server 130 and/or the communication device 110 determines the context information based on user information associated with the user. The user information associated with the user may, for example, include any a user presence, e.g., at home, at work, on holiday, etc., a user activity, e.g., driving, running, cycling, listening to music, etc., a user profile, e.g., gender, age, income, education, etc., a user preference, e.g., type of music, type of movies, type of food, type of sports, etc., and/or any other type of information associated with a user. The user information may be set based on user input, a sensor, and/or any other type of input mechanism.

In some example embodiments, the context server 130 and/or the communication device 110 communicates the obfuscated context information to the third-party server 140 for a value added service. The third-party server 140 may, for example, include any type of third-party server including an advertisement server, a video server, a survey server, a movie server, a map server, and/or any other server that provides a value added service. The value added service may, for example, include any type of service including an advertisement service, a video service, a survey service, a movie service, a map service, and/or any other service that adds value.

As a further example, the context server 130 and/or the communication device 110 communicates the obfuscated context information to the third-party server 140. For example, the obfuscated context information includes user age range of twenty to thirty and a user location of at the airport. In another example embodiment, the obfuscated context information includes a current user activity of talking and a user location of at the train station.

In some example embodiments, the external display device 115 receives a value added service from the third-party server and plays the value added service on the external display device 115. The external display device 115 may be in proximity to the user location. For example, the external display device 115 located in the waiting room at the train station receives an advertisement video for more talk time for your wireless phone from an advertisement server and plays the advertisement video. In this example, the external display device 115 is in proximity to the user location of at the train station. As a further example, the advertisement server determines the advertisement to play, in this example, the advertisement video for more talk time for your wireless phone, based on the user current activity of talking.

In some example embodiments, the communication device 110 receives a value added service from the third-party server 140 and plays the value added service on the communication device 110 associated with the user. In another example embodiment, the communication device 110 receives a survey from a survey server. The survey may include, for example, questions regarding a half-time performance at a local sporting event. Based on the obfuscated context information, in this example, male aged twenty to thirty who is interested in sports, the survey server determined that the user may respond to this survey. As such, the survey server communicates the survey to the communication device 110 via the communication network 120. In some example embodiments, the survey server communicates the survey via a proxy, e.g., the context server 130, a gateway, a firewall, etc., to maintain the privacy of the user.

In some example embodiments, the context server 130 and/or the communication device 110 receives an update request from the third-party server 140. The context server 130 and/or the communication device 110 obfuscates the context information based on the user information, such as a user privacy policy, user profile, user preferences and/or user activity, and the update request to form a second obfuscated context information. The context server 130 and/or the communication device 110 communicates the second obfuscated context information to the third-party server 140 for the value added service. An advantage of the obfuscation of the context information is that a compromise between privacy and usage may be determined which provides the highest level of privacy while still enabling the efficient delivery of value added services.

For example, the third-party server 140 processes the obfuscated context information, in this example, age range of twenty to thirty and user location of the airport, and determines that no advertisement criteria matches the obfuscated context information. The third-party server 140 may generate the update request for additional and/or broader obfuscated context information to match the advertisement criteria. In this example, the update request requests a more detailed location level, e.g., terminal in the airport, baggage claim location in the airport, airline, etc. The third-party server 140 communicates the update request for a more detailed location level to the context server 130 and/or the communication device 110.

As a further example, the context server 130 and/or the communication device 110 receives the update request from a more detailed location level from the third-party server 140. The context server 130 and/or the communication device 110 obfuscates the context information based on the user privacy policy, in this example, age range only and user location, first level landmark only and second level floor location in the landmark only, and the update request, in this example, more detailed location level, to form a second obfuscated context information, in this example, age range of twenty to thirty and user location of terminal one in the airport. The context server 130 and/or the communication device 110 communicates the second obfuscated context information to the third-party server 140 for the value added service.

In some example embodiments, the update request comprises target usage information for an intended value added service. For example, the target usage information is males from the age of thirty to forty who are married and are within one block of the train station. In another example embodiment, the target usage information is females from the age of forty to fifty who have kids and are within the shopping mall. In this example, the target usage information is targeted to a group that a store wants to attract and the intended value added service is an advertisement for the store, e.g., children's clothing store, spa store, etc. An advantage of the obfuscation of the context information is that the value added service may be customized based on the context information that the user is willing to share via the user privacy policy.

In some example embodiments, the update request comprises minimum context information for the value added service, e.g., age range, location within one block, current activity, etc., preferred information for the value added service, e.g., gender, type of movies, location within one mile, etc., value added service options associated with the obfuscated context information, e.g., food advertisements, full screen movies only, etc., value added service type information, e.g., store advertisements have priority, movies are highest priority, etc., a value added service field, e.g., gender, age range, etc., and/or any other type of information associated with the value added service.

In some example embodiments, the context server 130 and/or the communication device 110 determines the third-party server 140 from a plurality of third-party servers A 140a through Z 140z based on the obfuscated context information, a third-party server preference, e.g., certain types of landmarks only, grocery stores only, music lovers only, high end phone users only, etc., and/or any other type of information associated with a third-party server 140, e.g., load balancing, lowest network activity, etc. For example, the third-party server A 140a is associated with car advertisements for males and the third-party server B (not shown) is associated with car advertisements for females. In this example, the context server 130 determines to communicate with the third-party server B because the obfuscated context information includes gender is female. An advantage of the obfuscation of the context information is that the obfuscated context information even after being obfuscated based on the third-party server preference is still privacy preserving and does not identify the user.

In some example embodiments, the context server 130 and/or the communication device 110 modify the user privacy policy based on a privacy update request from the user. The user privacy policy may include, for example, information associated with the type and/or quality of information that the user wants to allow a third-party server 140 to access. An advantage of obfuscating the context information based on the user privacy policy is that the privacy of the user, i.e., identity and/or traceability of the user, is preserved while still enabling the usability of the obfuscated context information by the third-party server 140, i.e., match suitable value added services.

For example, the user changes the user privacy policy via a user interface on the communication device 110. In this example, the change in the user privacy policy includes modifying the user location from a minimum radius of one thousand feet to a minimum radius of one mile. An another example, the user changes the user privacy policy via a web based interface on the context server 130. In this example, the change in the user privacy policy includes modifying the maximum number of zip code digits from two digits, e. 01xxx, 02xxx, etc., to three digits, e.g., 014xx, 015xx, etc.

In some example embodiments, the user privacy policy is a group privacy policy. An advantage is that the privacy policy for a plurality of users can be centrally controlled and/or maintained which increases the efficiency of the management of the plurality of users. The group privacy policy may be, for example, associated with a company, e.g., Acme Company employees are under the same group privacy policy, etc., a geographical location, e.g., all users in the Commonwealth of Massachusetts have a standard based privacy policy, all users currently located in the airport, etc., and/or any other type of delineation of users.

In some example embodiments, the context server 130 and/or the communication device 110 modifies the group privacy policy based on a privacy update request. For example, the administrator of the group privacy policy sends a privacy update request, in this example, modify the allowed landmark types to remove grocery stores, to the context server 130. The context server 130 may modify the group privacy policy based on the privacy update request.

In some example embodiments, the context server 130 centrally manages the group privacy policy and the context information is obfuscated by the context server 130 based on the group privacy policy. In some examples, the communication device 110 obfuscates the context server based on the group privacy policy. The communication device 110 may request the group privacy policy from the context server 130 every time that context information needs to be obfuscated, may update the group privacy policy periodically, and/or the context server 130 may communicate updates to the group privacy policy to the communication device 110.

In some example embodiments, the context server 130 and/or the communication device 110 obfuscates the context information based on the user's privacy policy and the group privacy policy. The user's privacy policy or the group privacy policy may include more restrictive privacy parameters, e.g., user location, user activity, etc., and the more restrictive privacy parameters are utilized for the obfuscation of the context information.

In some example embodiments, the context server 130 and/or the communication device 110 obfuscates the context information based on the user information, such as a user privacy policy, user profile, user preferences and/or user activity, and a third-party server preference. The third-party server preference may include, for example, a location level, a presence level, an activity level, a user profile detail, a user preference, a user level capability detail, and/or any other information associated with a value added service. For example, the context information includes details about the user's communication device 110 including the capability to play movies. The third-party server preference is to determine the multimedia capability of the user's communication device 110. As such, in this example, the communication device 110 obfuscates the context information based on the user privacy policy, e.g., obfuscating the user location to a two mile radius, and includes information about the capability of the user's communication device 110 to play movies.

In some example embodiments, the context server 130 and/or the communication device 110 modifies the context information based on a context hierarchy based on the user privacy policy. The context hierarchy may, for example, include a hierarchy of locations, e.g., region to state to city to neighborhood to street, etc., a hierarchy of presence levels, e.g., at home watching a movie about World War TI to at home watching a movie to at home, etc., a hierarchy of activity levels, e.g., driving a Acme automobile to driving a car to driving to busy, etc., a hierarchy of user profile details, a hierarchy of user preferences, and/or a hierarchy of communication device capability details. The context server 130 and/or the communication device 110 may modify the context information on the context hierarchy based on the user privacy policy by moving up or down the hierarchy to meet the requirements of the privacy policy.

In some example embodiments, the obfuscation of the context information based on the user privacy policy by the context server 130 and/or the communication device 110 includes enlarging a user location and/or a user group based on the user privacy policy. The enlargement of the user location may include, for example, increasing the radius of the user location, increasing the radius of the user location based on a landmark density, e.g., at least twenty landmarks in the area, etc., changing the geographical level of the geographical area, and/or any other type of enlargement of the user location to increase the privacy of the user's context information. The enlargement of the user group may include, for example, an age range, a type of activity, e.g., fishing, bowling, hunting, etc., a occupation, e.g., a computer scientist, a lawyer, a medical doctor, etc., and/or any other type of grouping of people. An advantage is that the user's location and/or the user group may be obfuscated while still providing enough information to the third-party server 140 to deliver the value added service which is individualized based on the obfuscated context information thereby increasing the value of the delivery value added service.

In some example embodiments, the obfuscation of the context information based on the user privacy policy by the context server 130 and/or the communication device 110 includes determining a generic user preference and/or a user category based on the user privacy policy. The generic user preference may include, for example, any type of user preference that may be made generic for people, e.g., football fan generic for sports fan, hikes every week generic for athletic, etc. The user category may include, for example, any type of user category, e.g., male, female, under thirty-five, over sixty-five, etc.

In some example embodiments, the obfuscation of the context information based on the user privacy policy by the context server 130 and/or the communication device 110 includes selecting a landmark associated with a user location and/or the context information based on the user privacy policy. The landmark may include, for example, any type of landmark including a general landmark, e.g., train station, grocery store, etc., and/or a specific landmark, e.g., specific train station, specific grocery store, etc. The landmark may be selected based on the user location, e.g., grocery store within one mile, pharmacy within five miles, etc., and/or the context information, e.g., grocery store near the user's home, mall with a spa, etc.

In some example embodiments, the user privacy policy includes an allowed location level, an allowed presence level, an allowed activity level, an allowed user profile detail, an allowed user preference, an allowed user device detail, and/or any other type of parameter associated with a user's privacy. The user privacy policy may include a plurality of levels. For example, the first allowed location is five miles and the second allowed location is one mile. In other words, the initial obfuscated context information may enlarge the user location to at least five miles. However, if the third-party server 140 requests detailed information and/or the third-party preference requests more detailed information, the context information may be obfuscated to provide the user location to one mile.

In some example embodiments, the communication device 110 and/or the context server 130 communicates part or all of the user privacy policy to a plurality of communication devices A 110*a* through Z 110*z*. The communication device 110 and/or the context server 130 receive privacy policy information from the plurality of communication devices A 110*a* through Z 110*z*. The communication device 110 and/or the context server 130 obfuscates the context information based on the user privacy policy and/or the privacy policy information. An advantage is that the level of privacy is shared among a plurality of communication devices which enables the obfuscated context information to be sufficiently detailed while still preserving the privacy of the individual users.

For example, the plurality of communication devices A 110*a* through Z 110*z* share information about the level of privacy shared with the third-party server 140. In other words, the plurality of communication devices A 110*a* through Z 110*z* communication among themselves to determine what context information is shared with the third-party server 140 and this level of privacy, e.g., user location radius of one mile, user activity level of five year age range, etc. Each communication device 110 may obfuscate the context information based on this shared level of privacy. An advantage is that generalized context information needed for the value added services may be efficiently shared among a plurality of communication devices 110.

In some example embodiments, the communication device 110 and/or the context server 130 receive one or more media objects, e.g., video, audio, text, image, map, point of interest, etc. or any combination thereof, for obfuscation. The context information may includes metadata, e.g., name, date, comments, creator's identification, commentator's identification, information regarding what to obfuscate, etc., of the one or more media objects. The communication device 110 and/or the context server 130 may obfuscate the metadata based on the user information, such as the user privacy policy, user profile, user preferences and/or user activity. The communication device 110 and/or the context server 130 may modify the user privacy policy based on the metadata.

In some example embodiments, the communication device 110 and/or the context server 130 obfuscate the one or more media objects based on the metadata, e.g., identification of a picture, identification of a date, etc.) In other words, the metadata may include information regarding user identification of privacy sensitive objects. The user may identify the privacy sensitive objects via a user interface in the communication device 110 and/or in the context server 130.

In some example embodiments, the communication device 110 and/or the context server 130 modifies the metadata based on the user information, such as the user privacy policy, user profile, user preferences and/or user activity. The metadata may be modified to obfuscate the information contained within based on the user information, such as the user privacy policy. For example, the metadata includes a name of an individual in the media object, and the user privacy policy provides a restriction against names being transmitted to the third-party server 140. In this example, the communication device 110 obfuscates the name of the individual which is in the metadata based on this restriction against names in the user privacy policy.

The following Tables 1-2 illustrate example obfuscations of context information. For example, Table 1 illustrates the context information for a user including the age of the user as thirty four. The user privacy policy parameters in this example state that the age may only be provided to third-party servers in at least a ten year range. As such, in this example, the obfuscated context information is an age range of thirty to forty. In another example embodiment, Table 2 illustrates the context information for a user including a high end wireless phone type. The user privacy policy parameters do not have any parameters regarding the type of wireless phone. As such, in this example, the obfuscated context information is the same as the context information, i.e., a high end wireless phone type.

TABLE 1

Example Obfuscated Context Information

| Context Information | Privacy Policy Parameters | Obfuscated Context Information |
|---|---|---|
| Age = 34 | Age range of at least ten years | Age Range = 30-40 |
| Last music purchase = Best Hits of Country Western Ballad | Generic purchase categories | Purchase = Music |
| User Location = One Main Street, Boston, MA | Location to closed landmark | Landmark = Boston Common |

TABLE 2

Example Obfuscated Context Information

| Context Information | Privacy Policy Parameters | Obfuscated Context Information |
|---|---|---|
| Age = 26 | Generation only | Generation = X |
| Wireless Phone Type = High End | No Parameters | Wireless Phone Type = High End |
| User Location = Platform A, Park Street T Station, Boston, MA | At least ten other people in area | User Location = Park Street T Station, Boston, MA |

In some example embodiments, users share personal content, e.g., pictures, tracks, short message service, etc., by storing the content in an Internet service. Users also may combine content, e.g., Nokia Sports tracker enables the combination of a user created GPS track with music, videos and pictures taken on a trip, etc., and/or may extend the combination of content to other activities which are done via the mobile phone, e.g., friends which were met, search queries, items purchased in a shopping list, messages sent, etc. A user interface is provided via the communication device 110 of FIG. 1 which enables the sharing of these combined media object and the preservation of privacy by enabling the obfuscation of objects within the shared content. The combined media object may include GPS tracks, pictures, videos, maps, point of interests, messages sent/received, call events, media consumption, e.g., music listened to, video watched, etc., purchase events, service queries, and/or any other type of media.

In some example embodiments, the user interface provides for a control lever, e.g., slider, which enables the user to select a privacy level for each kind of data in the combined data object via a separate control lever. For example, the user may: take out song titles from sports tracker sharing objects which include songs, obfuscate people faces on pictures in sports tracker pictures, take out sensitive items from purchase lists, which might reveal private issues, e.g., alcohol, pregnancy test, etc., and/or obfuscate timeline on tracks which stop at specific shops—hence it does not reveal which shops are visited. An advantage is that user may share their combined data and not reveal all of their details via an easy to use user interface.

In some example embodiments, the obfuscation module 215 of FIG. 2 learns which properties a user typically wants to obfuscate. The obfuscation module 215 may suggest these properties for future obfuscations for the user and/or update the user privacy policy based on these properties. For example, the user may select combine objects to be obfuscation. The obfuscation module 215 selects items to be modified based on learning algorithms applied to this and earlier obfuscations with the user. The selections may be presented to the user for confirmation, and user may ask for more or fewer objects. The earlier obfuscations are used as examples to perform similar obfuscation as in earlier examples. This can be done by learning algorithms which generalize the specific obfuscations done by user, e.g., if the user removes a specific song title, the system may generalize this to removal of any song title.

As another example, the user selects a song and asks to obfuscate the song title. The obfuscation module 215 may suggest to obfuscate just the name of the artist, but the user may request more obfuscation. Based on the user's request for more obfuscation, the obfuscation module 215 may obfuscate the information to the category, in this example, rock music. As a further example, the obfuscation module 215 may apply the learning of the user's desired obfuscation to all future songs, to songs from the same artist, or to songs in the same category.

In one example embodiment, the obfuscation module 215 may determine obfuscation options, e.g., how to obfuscate, properties for obfuscation, etc., based on the receiver, such as the value added service provider, and/or its purpose and nature. For example, content sent to internet picture service/sites may be obfuscated based on a level they are shared. As a further example, if friends are on the pictures to whom you sent/share the content, the obfuscation level may be lower. On the other hand, for example, if the pictures are shared publicly, the obfuscation level may be higher.

The user may also set specific and/or default obfuscation levels for every value added service and/or value added service provider. As a further example, for sharing associated with a sports competition, pictures and shopping may be more obfuscated and the track may be less obfuscated. The user may set specific and/or default obfuscation levels for every person and/or group of people. For example, content sent or shared with a friend may be free of obfuscation, but content sent or shared with a colleague may be obfuscated to a certain user selected level.

Various embodiments described herein may be implemented in software, hardware, application logic or a combination of software, hardware and application logic. The software, application logic and/or hardware may reside, for example, on a chipset, a mobile device, a desktop, a laptop or a server. Software and web implementations of various embodiments can be accomplished with standard programming techniques with rule-based logic and other logic to accomplish various database searching steps or processes, correlation steps or processes, comparison steps or processes and decision steps or processes. Various embodiments may also be fully or partially implemented within network elements or modules. It should be noted that the words "component" and "module," as used herein and in the following claims, is intended to encompass implementations using one or more lines of software code, and/or hardware implementations, and/or equipment for receiving manual inputs.

The above-described systems and methods may be implemented in digital electronic circuitry, in computer hardware, firmware, and/or software. The implementation may be as a computer program product, i.e., a computer program tangibly embodied in an information carrier). The implementation may, for example, be in a machine-readable storage device, for execution by, or to control the operation of, data processing apparatus. The implementation may, for example, be a programmable processor, a computer, and/or multiple computers.

A computer program may be written in any form of programming language, comprising compiled and/or interpreted languages, and the computer program may be deployed in any form, comprising as a stand-alone program or as a subroutine, element, and/or other unit suitable for use in a computing environment. A computer program may be deployed to be executed on one computer or on multiple computers at one site.

Method steps may be performed by one or more programmable processors executing a computer program to perform functions of the invention by operating on input data and generating output. Method steps may also be performed by and an apparatus may be implemented as special purpose logic circuitry. The circuitry may, for example, be a FPGA (field programmable gate array) and/or an ASIC (application specific integrated circuit). Modules, subroutines, and software agents may refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer may include, may be operatively coupled to receive data from and/or transfer data to one or more mass storage devices for storing data, e.g., magnetic, magneto-optical disks, or optical disks.

Data transmission and instructions may also occur over a communications network. Information carriers suitable for embodying computer program instructions and data include all forms of non-volatile memory, comprising by way of example semiconductor memory devices. The information carriers may, for example, be erasable programmable read-only memory (EPROM), electrically erasable programmable read-only memory (EEPROM), flash memory devices, magnetic disks, internal hard disks, removable disks, magneto-optical disks, compact disc read-only memory (CD-ROM), and/or digital video disc read-only memory (DVD-ROM) disks. The processor and the memory may be supplemented by, and/or incorporated in special purpose logic circuitry.

To provide for interaction with a user, the above described techniques may be implemented on a computer having a display. The display may, for example, be a cathode ray tube (CRT) and/or a liquid crystal display (LCD) monitor. The interaction with a user may, for example, be a display of information to the user and a keyboard and a pointing device, e.g., a mouse or a trackball, by which the user may provide input to the computer, e.g., interact with a user interface element. Other kinds of devices may be used to provide for interaction with a user. Other devices may, for example, be feedback provided to the user in any form of sensory feedback, e.g., visual feedback, auditory feedback, or tactile feedback. Input from the user may, for example, be received in any form, comprising acoustic, speech, and/or tactile input.

The above described techniques may be implemented in a distributed computing system that comprises a back-end component. The back-end component may, for example, be a data server, a middleware component, and/or an application server. The above described techniques may be implemented in a distributing computing system that comprises a front-end component. The front-end component may, for example, be a client computer having a graphical user interface, a Web browser through which a user may interact with an example implementation, and/or other graphical user interfaces for a transmitting device. The components of the system may be interconnected by any form or medium of digital data communication, e.g., a network.

Examples of wired or wireless networks include a local area network (LAN), a wide area network (WAN), the Internet, packet-based networks, and/or carrier-based networks. Connectivity to the network may include, but is not limited to, long range wireless connections, short range wireless connections, and various wired connections comprising, but not limited to, telephone lines, cable lines, power lines, and the like.

Packet-based networks may include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks may include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

In some example embodiments, the server may be connected to a gateway through a communication network. The gateway may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways include MCUs, gateways between circuit-switched and packet-switched video telephony, Push-to-talk over Cellular (PoC) servers, IP encapsulators in digital video broadcasting-handheld (DVB-H) systems, or set-top boxes that forward broadcast transmissions locally to home wireless networks. When RTP is used, the gateway is called an RTP mixer or an RTP translator and acts as an endpoint of an RTP connection.

The system may include clients and servers. A client and a server are generally remote from each other and interact through a communication network. The relationship of client and server arises by virtue of computer programs running on the respective computers and having a client-server relationship to each other.

The communication device 110, 210, 310, 410, and 510 may include, for example, a computer, a mobile computer, a computer with a browser device, a telephone, an IP phone, a mobile device, cellular phone, personal digital assistant (PDA) device, laptop computer, electronic mail device, audio/video player, digital camera/camcorder, game device, and/or other communication devices, or any combination thereof. The browser device comprises, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device comprises, for example, a personal digital assistant (PDA).

The communication devices may be, for example, stationary or mobile as when carried by an individual who is moving. The communication devices may also be located in a mode of transportation comprising, but not limited to, an automobile, a truck, a taxi, a bus, a train, a boat, an airplane, a bicycle, a motorcycle, etc. Some or all of the communication devices may send and receive calls and messages and communicate with service providers through a wireless connection to a base station. The base station may be connected to a network server that allows communication between the mobile telephone network and the network. The system may include additional communication devices and communication devices of different types.

The communication devices may communicate using various transmission technologies comprising, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device involved in implementing various embodiments of the present invention may communicate using various media comprising, but not limited to, radio, infrared, laser, cable connection, and the like.

Comprise, include, and/or plural forms of each are open ended and include the listed parts and may include additional parts that are not listed. And/or is open ended and comprises one or more of the listed parts and combinations of the listed parts.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

In other embodiments, the method further comprising determining the context information based on user information associated with the user.

In some embodiments, the user information comprises a user presence, a user activity, a user profile, a user preference, and/or any combination thereof.

In other embodiments, the method further comprising receiving a value added service from the third-party server and playing the value added service on a display device in proximity to the user location.

In some embodiments, the method further comprising receiving a value added service from the third-party server and playing the value added service on the communication device associated with the user.

In other embodiments, the value added service comprises an advertisement.

In some embodiments, the update request comprises target usage information for an intended value added service.

In other embodiments, the update request comprises minimum context information for the value added service, preferred information for the value added service, value added service options associated with the obfuscated context information, value added service type information, a value added service field, or any combination thereof.

In some embodiments, the method further comprising determining the third-party server from a plurality of third-party servers based on the obfuscated context information, a third-party server preference, or any combination thereof.

In other embodiments, the privacy policy is a group privacy policy and the method further comprising modifying the group privacy policy based on a privacy update request.

In some embodiments, the obfuscating the context information based on the privacy policy further comprising modifying the context information on a context hierarchy based on the privacy policy.

In other embodiments, the privacy policy comprises an allowed location level, an allowed presence level, an allowed activity level, an allowed user profile detail, an allowed user preference, an allowed user device detail, and/or any combination thereof.

In some embodiments, the method further comprising modifying the privacy policy based on the metadata.

In other embodiments, the method further comprising modifying the metadata information based on the privacy policy.

In some embodiments, the level identification of the one or more object categories identifies a pre-determined privacy level in a plurality of pre-determined privacy levels.

In other embodiments, the apparatus further comprising a privacy policy processor further configured to modify the privacy policy based on a privacy update request from the user.

In some embodiments, the obfuscating the context information based on the privacy policy further comprising obfuscating the context information based on the privacy policy and at least one part of the context information.

What is claimed:

1. A method comprising:
    determining, by a communication device, context information associated with a user based on information of the communication device associated with the user;
    receiving, by the communication device, a level identification of one or more objects, one or more object categories, or a combination thereof, for obfuscation;
    determining, by the communication device, a privacy policy of the user based on the level identification that specifies one of a plurality of user activity levels of one or more user physical activities that are independent from user interactions with the communication device and independent from operations of an apparatus of a service provider;
    obfuscating, by the communication device, at least one user activity portion of the context information based on the specified user activity level; and
    initiating, by the communication device, a presentation of the context information after the obfuscating on a user interface of the communication device, prior to communicating the context information to a third-party server.

2. The method of claim 1, further comprising determining the context information based on a user location associated with a location of the communication device associated with the user.

3. The method of claim 1, further comprising communicating the obfuscated context information to the third-party server for a value-added service,
    wherein the one or more user physical activities include driving, exercising, shopping, or a combination thereof, and the at least one user activity portion of the context information is obfuscated based on the specified user activity level of driving, exercising, shopping, or a combination thereof.

4. The method of claim 3, further comprising:
    receiving an update request from the third-party server;
    obfuscating the context information based on the privacy policy and the update request to form a second obfuscated context information; and
    communicating the second obfuscated context information to the third-party server for the value-added service.

5. The method of claim 1, further comprising: modifying the privacy policy based on a privacy update request from the user,
    wherein the one or more user physical activities include consuming or sharing media content, and the at least one user activity portion of the context information is obfuscated based on the specified user activity level of the consuming or sharing media content via adding randomness to one or more tracks of the media content, reducing resolution of the media content, obfuscating one or more faces in the media content, generalizing artist information of the media content, generalizing user consumption data of the media content, or a combination thereof.

6. The method of claim 1, wherein obfuscating the context information based on the privacy policy further comprises obfuscating the context information based on the privacy policy and a third-party server preference.

7. The method of claim 1, wherein obfuscating the context information based on the privacy policy further comprises enlarging a user location and/or a user group based on the privacy policy, and replacing the context information with the enlarged user location and/or user group.

8. The method of claim 1, wherein the obfuscating the context information based on the privacy policy further comprises determining a generic user preference and/or a user category based on the privacy policy, and replacing the context information with the generic user preference and/or the user category.

9. The method of claim 1, wherein obfuscating the context information based on the privacy policy further comprises selecting a landmark associated with a user location and/or the context information based on the privacy policy, and replacing the user location and/or the context information with the landmark.

10. The method of claim 1, further comprising:
    communicating part or all of the privacy policy to a plurality of communication devices; and receiving privacy policy information from the plurality of communication devices; wherein obfuscating the context information based on the privacy policy further comprises obfuscating the context information based on the privacy policy and/or the privacy policy information.

11. The method of claim 1, further comprising: receiving one or more media objects for obfuscation, the context information comprising metadata of the one or more media objects; and obfuscating the metadata based on the privacy policy.

12. The method of claim 1, further comprising:
adjusting the level identification in response to one or more user interactions with one or more slider objects presented in the user interface.

13. The method of claim 1, wherein the user activity levels are defined by at least one user activity in conjunction with one or more other parameters, and
the one or more other parameters include one or more user location parameters, one or more user profile parameters, one or more user preference parameters, one or more user device capability parameters, or a combination thereof.

14. The method of claim 1, wherein the privacy policy of the user is determined based on the level identification that further specifies at least one of a plurality of user presence levels in conjunction with the plurality of user activity levels,
wherein the user presence levels are defined by at least one user location in conjunction with one or more other parameters, and
wherein the one or more other parameters include one or more user profile parameters, one or more user preference parameters, or a combination thereof.

15. An apparatus comprising:
at least one processor; and
at least one memory including computer program code for one or more programs,
the at least one memory and the computer program code configured to, with the at least one processor, cause the apparatus embedded in a communication device to perform at least the following,
determine context information associated with a user based on information of the communication device associated with the user;
receive a level identification of one or more objects, one or more object categories, or a combination thereof, for obfuscation;
determine a privacy policy of the user based on the level identification that specifies one of a plurality of user activity levels of one or more user physical activities that are independent from user interactions with the communication device and independent from operations of an apparatus of a service provider;
obfuscate by the apparatus at least one user activity portion of the context information based on the specified user activity level; and
initiate a presentation of the context information after the obfuscating on a user interface of the communication device, prior to communicating the context information to a third-party server.

16. The apparatus of claim 15, wherein the apparatus is further caused to:
determine the context information based on a user location associated with a location of the communication device associated with the user.

17. The apparatus of claim 16, wherein the apparatus is further caused to:
receive a value-added service from the third-party server; and cause, at least in part, a display of the value-added service by a display device in proximity to the user location.

18. The apparatus of claim 15, wherein apparatus is further caused to:
determine the context information based on user information associated with the user.

19. The apparatus of claim 15, wherein the apparatus is further caused to:
communicate the obfuscated context information to the third-party server for a value-added service.

20. A non-transitory computer-readable storage medium carrying one or more sequences of one or more instructions which, when executed by one or more processors, cause a communication device to at least perform the following steps:
determining context information associated with a user based on information of the communication device associated with the user;
receiving a level identification of one or more objects, one or more object categories, or a combination thereof, for obfuscation;
determining a privacy policy of the user based on the level identification that specifies one of a plurality of user activity levels of one or more user physical activities that are independent from user interactions with the communication device and independent from operations of an apparatus of a service provider;
obfuscating at least one user activity portion of the context information based on the specified user activity level; and
initiating a presentation of the context information after the obfuscating on a user interface of the communication device, prior to communicating the context information to a third-party server.

* * * * *